(12) United States Patent  
Hares et al.

(10) Patent No.: US 8,861,345 B2  
(45) Date of Patent: Oct. 14, 2014

(54) BORDER GATEWAY PROTOCOL EXTENSION FOR THE HOST JOINING/LEAVING A VIRTUAL PRIVATE NETWORK

(71) Applicant: Futurewei Technologies, Co., Plano, TX (US)

(72) Inventors: Susan Hares, Saline, MI (US); Lucy Yong, McKinney, TX (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 13/668,255

(22) Filed: Nov. 3, 2012

(65) Prior Publication Data

US 2013/0117449 A1 May 9, 2013

Related U.S. Application Data

(60) Provisional application No. 61/555,370, filed on Nov. 3, 2011.

(51) Int. Cl.
*H04L 12/28* (2006.01)
*H04L 12/715* (2013.01)
*H04L 29/06* (2006.01)

(52) U.S. Cl.
CPC .............. *H04L 45/04* (2013.01); *H04L 29/06* (2013.01)
USPC ........................ 370/229; 709/224; 709/225

(58) Field of Classification Search
CPC ... H04L 45/04; H04L 29/06; H04L 29/08072; H04L 29/0809; H04L 29/08144; H04L 63/08
USPC ......... 370/229, 235, 236, 254–255, 351, 389, 370/400, 401, 409; 709/224–225; 340/1.1–16.1; 710/36, 107, 200, 220, 710/240; 711/150; 726/1–36
See application file for complete search history.

(56) References Cited

U.S. PATENT DOCUMENTS 6,526,056 B1 * 2/2003 Rekhter et al. ................ 370/392
7,787,396 B1 * 8/2010 Nalawade et al. ............ 370/254

(Continued)

OTHER PUBLICATIONS

BGP/MPLS IP Virtual Rivate Network (VPNs), (RFC 4364), Feb. 2006, form Applicant's IDS filed on Mar. 18, 2013.*

(Continued)

*Primary Examiner* — Mark Rinehart
*Assistant Examiner* — Mang Yeung
(74) *Attorney, Agent, or Firm* — Conley Rose, P.C.; Grant Rodolph; William H. Dietrich

(57) ABSTRACT

A method for performing an automatic join and leave function for either a host or network using Border Gateway Protocol (BGP) signaling, the method comprising, sending a BGP join request that indicates a request to join a virtual network, receiving a BGP join response that indicates either an acceptance or a rejection of the BGP join request, adding the host to the virtual network when the BGP join response accepts the BGP join request, sending a BGP leave request that indicates a request to leave the virtual network, receiving a BGP leave response that indicates either an acceptance or a rejection of the BGP leave request, and removing the host from the virtual network when the BGP leave response accepts the BGP leave request, wherein the BGP join request comprises a quality of service (QoS) requirement and a bandwidth requirement.

23 Claims, 21 Drawing Sheets

(56) References Cited

U.S. PATENT DOCUMENTS

| | | | |
|---|---|---|---|
| 7,990,893 B1* | 8/2011 | Singh | 370/254 |
| 2005/0025118 A1* | 2/2005 | Hao et al. | 370/351 |
| 2006/0171404 A1* | 8/2006 | Nalawade et al. | 370/401 |
| 2007/0064698 A1* | 3/2007 | Appanna | 370/392 |
| 2007/0133406 A1* | 6/2007 | Vasseur | 370/230 |
| 2009/0083403 A1* | 3/2009 | Xu et al. | 709/220 |
| 2011/0158113 A1* | 6/2011 | Nanda et al. | 370/252 |

OTHER PUBLICATIONS

Capability Advertisement with BGP-4, (RFC 5492), Feb. 2009, from Applicant's IDS filed on Mar. 18, 2013.*
Rekhter, Y., Ed, et al., "A Border Gateway Protocol 4(BGP 4)." RFC 4271, Jan. 2006.*
Marques, P., et al., "Constrained Route Distribution for Border Gateway Protocol/MultiProtocol Label Switching (BGP/MPLS) Internet Protocol (IP) Virtual Private Networks (VPNs)." RFC 4684, Nov. 2006.*
Chen, E, et al., "Address-Prefix-Bases Outbound Route Filter for BGP-4." RFC 5292, Aug. 2008.*
Bates, T. et al., "Multiprotocol Extensions for BGP-4," RFC 2858, Jun. 2000, 11 pages.
Chen, E. et al., "Route Refresh Capability for BGP-4," RFC 2918, Sep. 2000, 4 pages.
Rekhter, Y. et al., "Carrying Label Information in BGP-4," RFC 3107, May 2001, 8 pages.
Rosen, E., et al., "BGP/MPLS IP Virtual Private Networks (VPNs)," RFC 4364, Feb. 1, 2006, 47 pages.
Bates, T. et al., "Multiprotocol Extensions for BGP-4," RFC 4760, Jan. 2007, 12 pages.
Sangli, S. et al., "Graceful Restart Mechanism for BGP," RFC 4724, Jan. 2007, 15 pages.
Chen, E. et al., "Outbound Route Filtering Capability for BGP-4," RFC 5291, Aug. 2008, 12 pages.
Scudder, J. et al., "Capabilities Advertisement with BGP-4," RFC 5492, Feb. 2009, 8 pages.
Le Faucheur, F. et al., "Advertising IPv4 Network Layer Reachability Information with an IPv6 Next Hop," RFC 5549, May 2009, 10 pages.
Vohra, Q. et al., "BGP Support for Four-Octet Autonomous System (AS) Number Space," RFC 6793, Dec. 2012, 12 pages.
Scudder, J. et al., "Multisession BGP," draft-ietf-idr-bgp-multisession-06.txt, Mar. 28, 2011, 20 pages.
Patel, K. et al., "Enhanced Route Refresh Capability for BGP-4," draft-keyur-bgp-enhanced-route-refresh-02.txt, Mar. 30, 2011, 6 pages.
Chen, E. et al., "Dynamic Capability for BGP-4," draft-ietf-idr-dynamic-cap-13.txt, Jun. 2, 2011, 7 pages.
Walton, D. et al., "Advertisement of Multiple Paths in BGP," draft-ietf-idr-add-paths-06.txt, Sep. 15, 2011, 8 pages.
So, et al., "Requirements of Layer 3 Virtual Private Network for Data Centers," draft-so-vpn4dc-00.txt, Oct. 24, 2011, 8 pages.
Chen, E. et al., "Dynamic Capability for BGP-4," draft-ietf-idr-dynamic-cap-14.txt, Dec. 5, 2011, 7 pages.
Walton, D. et al., "Advertisement of Multiple Paths in BGP," draft-ietf-idr-add-paths-07.txt, Jun. 17, 2012, 8 pages.
Scudder, J. et al., "Multisession BGP," draft-ietf-idr-bgp-multisession-07.txt, Sep. 12, 2012, 20 pages.
Internet Assigned Nos. Authority (IANA), Capability Codes, Registry Included, http://www.iana.org/assignments/capability-codes/capability-codes.txt, downloaded from the Internet on Feb. 12, 2013, 1 page.
Foreign Communications From a Counterpart Application, PCT Application PCT/US2012/063469, International Search Report dated Feb. 25, 2013, 3 pages.
Foreign Communications From a Counterpart Application, PCT Application PCT/US2012/063469, Written Opinion, dated Feb. 25, 2013, 7 pages.
Aggarwal, et al., "BGP MPLS Based Ethernet VPN," draft-ietf-l2vpn-evpn-00, Feb. 24, 2012, 39 pages.
Sajassi, et al., "BGP MPLS Based Ethernet VPN," draft-ietf-l2vpn-evpn-01, Jul. 14, 2012, 43 pages.
Sajassi, et al., "BGP MPLS Based Ethernet VPN," draft-ietf-l2vpn-evpn-02, Oct. 22, 2012, 44 pages.
Internet Assigned Numbers Authority (IANA), "Address Family Numbers," http://www.iana.org/assignments/address-family-numbers/address-family-numbers.xhtml, downloaded from https://web.archive.org/web/20101206015740/ on Apr. 4, 2014, 2 pages.
Malin, G., "RIP Version 2," RFC 2453, Nov. 1998, 39 pages.
Internet Assigned Numbers Authority (IANA), "Subsequent Address Family Identifiers (SAFI) Parameters," http://www.iana.org/assignments/safi-namespace/safi-namespace.xhtml#safi-namespace-2, downloaded from https://web.archive.org/web/20101206003057/http://www.iana.org/assignments/safi-namespace on Apr. 4, 2014, 2 pages.
Plummer, David C., "An Ethernet Address Resolution Protocol or Converting Network Protocol Addresses to 48.bit Ethernet Address for Transmission on Ethernet Hardware," RFC 826, Nov. 1982, 10 pages.
Bradner, S., "Key Words for Use in RFCs to Indicate Requirement Levels," RFC 2119, Mar. 1997, 3 pages.
Rekhter, Y., Ed, et al.,"A Border Gateway Protocol 4 (BGP-4)," RFC 4271, Jan. 2006, 104 pages.
Marques, P., et al., "Constrained Route Distribution for Border Gateway Protocol/MultiProtocol Label Switching (BGP/MPLS) Internet Protocol (IP) Virtual Private Networks (VPNs)," RFC 4684, Nov. 2006, 14 pages.
Chen, E., et al, "Address-Prefix-Based Outbound Route Filter for BGP-4," RFC 5292, Aug. 2008, 6 pages.
Jeng, H., et al., "Virtual Hub-and-Spoke in BGP/MPLS VPNs," draft-ietf-l3vpn-virtual-hub-00.txt, Mar. 26, 2012, 19 pages.
Jeng, H., et al., "Virtual Hub-and-Spoke in BGP/MPLS VPNs," draft-ietf-l3vpn-virtual-hub-01.txt, Apr. 19, 2012, 22 pages.
Jeng, H., et al., "Virtual Hub-and-Spoke in BGP/MPLS VPNs," draft-ietf-l3vpn-virtual-hub-02.txt, Oct. 15, 2012, 22 pages.

* cited by examiner

BORDER GATEWAY PROTOCOL EXTENSION FOR THE HOST JOINING/LEAVING A VIRTUAL PRIVATE NETWORK

CROSS-REFERENCE TO RELATED APPLICATIONS

The present application claims priority to U.S. Provisional Patent Application No. 61/555,370 filed Nov. 3, 2011 by Susan Hares, et al. and entitled "Border Gateway Protocol Extension for the Host Joining/Leaving a Virtual Private Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Virtual and overlay network technology has significantly improved the information technology (IT) industry in terms of efficiency, cost, and processing power. Virtual and overlay network technology enables applications or services to operate in a virtual environment. For instance, several operating systems may operate in parallel using multiple virtual environments associated to a single central processing unit (CPU). Performing applications or services in parallel not only reduces overhead costs, but increases processing power. Additionally, virtual and overlay network technology may centralize administrative tasks while improving scalability and overall hardware-resource utilization. Virtual resources, such as computational, storage, or network elements may be redistributed or moved while applications and services are operating in the virtual environment. As a result, virtual and overlay network technology is central to the overall trend in creating IT environments that are able to manage themselves.

Many businesses and enterprises may utilize virtual and overlay network technology by purchasing virtual private network (VPN) services from a network service provider. VPN services, such as Layer 2 VPN (L2VPN) and Layer 3 VPN (L3VPN), offer secure and logically dedicated connectivity among multiple client sites. VPN services may use border gateway protocol (BGP) to establish connections between inter-connected different autonomous systems (ASs), such as the different client sites, to exchange routing information. When a BGP peer receives routes from a BGP peer in a different autonomous system over an external BGP (eBGP) connection, the BGP peer will generally redistributed the received routes to all internal BGP (iBGP) peers within the same AS or client site over iBGP connections or via an iBGP peer that acts as an route reflector. eBGP peers may be BGP peers that may use an eBGP connection to communicate route information, while iBGP peers may be BGP peers that use an iBGP connection to communicate route information.

BGP may also redistribute and exchange multiprotocol information using multiprotocol extensions as which may be denoted as Multiprotocol Extensions for BGP-4 as defined in Internet Engineering Task Force (IETF) Request for Comments (RFC) 4760, which is incorporated herein as if reproduced by its entirety. For example, the BGP multiprotocol extension can be used to exchange private network information among multiple sites. BGP multiprotocol extensions may currently include prefixes for: Internet Protocol (IP) version 4 (IPv4), IP version 6 (IPv6), multiprotocol label switching (MPLS), L3VPN, MPLS L2VPN, tunnel endpoints, Address-Based Outbound Router Filters, and flow specifications. BGP multi-protocol extensions may be designed to be able to add additional multi-protocol features either for private usage or as standardized well-known BGP features. Moreover, BGP may pass in-band operational status messages, such as advisory messages, operational message, and socialite message. Hence, BGP may be flexible and may be used for a variety of virtual networks.

The client may want to connect the private network that utilizes BGP to a data center (DC). The DC may house servers and other telecommunication equipment to provide network functionality, computational resources, and data storage. In an attempt to reduce network overhead costs and/or to increase network capacity and performance, a client may elect to subscribe to data center services from a data center service provider. By subscribing to the data center services, the client may be able to offload some of the dedicated client data center operations to the data center service provider. A data center service provider may offer client data center services through a virtual data center (vDC). The client may require connecting the specific vDC to the client's private network formed through the VPN services provided by the network service provider. A vDC may also utilize the VPN technology that utilizes BGP to interconnect virtual or physical computational resources, storage resources, and network alliance together for a client. In this case, eBGP may be used between vDC and a WAN VPN, where the DC network belongs to one AS and WAN network belongs to another AS.

To connect the specific virtual data center to the client's private network, the network service provider may need to extend VPN services to the data center service provider locations. Currently, extending VPN services from the network provider to the data center service provider requires manual configurations between the client and data center service provider, and between the network service provider and data center service provider. Unfortunately, the configuration process is time consuming and prone to error because of the multiple interfaces that need to be manually configured and the coordination between the two service providers and the client. Additionally, BGP has not been configured to automatically perform the manual configurations. Therefore, additional advances in BGP are necessary to automatically provision and configure the virtual data centers with private networks to reduce configuration complexity and improve configuration efficiency.

SUMMARY

In one example embodiment, the disclosure includes a method for performing an automatic join and leave function for either a host or network using BGP signaling, the method comprising, sending a BGP join request that indicates a request to join a virtual network, receiving a BGP join response that indicates either an acceptance or a rejection of the BGP join request, adding the host to the virtual network when the BGP join response accepts the BGP join request, sending a BGP leave request that indicates a request to leave the virtual network, receiving a BGP leave response that indicates either an acceptance or a rejection of the BGP leave request, and removing the host from the virtual network when the BGP leave response accepts the BGP leave request, wherein the BGP join request comprises a quality of service (QoS) requirement and a bandwidth requirement.

In yet another example embodiment, the disclosure includes An apparatus that requests to provision a host to a virtual network using BGP signaling, wherein the apparatus comprises a processor coupled to a transmitter and receiver, wherein the processor is configured to support a first set of BGP capabilities, wherein the first set of BGP capabilities comprises at least one BGP capability, receive a first Open message comprising a second set of BGP capabilities, wherein the second set of BGP capabilities comprises at least one BGP capability, determine to either accept or reject the first Open message, wherein the first Open message is accepted when the first set of BGP capabilities and the second set of BGP capabilities are the same, transmit a second Open message comprising the first set of BGP capabilities, wherein the second Open message indicates either acceptance or rejection of the first Open message, transmit a first BGP Route Refresh request after accepting the first Open message, wherein the BGP Route Refresh request comprises an outbound route filtering field associated with the virtual network, and receive a BGP Route Refresh response after transmitting the BGP Route Refresh request, wherein the BGP Route Refresh response indicates a request for at least one route to transport a data frame, and wherein the host joins the virtual network when the BGP Route Refresh response indicates accepting the BGP Route Refresh request.

In yet another example embodiment, the disclosure includes a An apparatus that determines whether to provision a network to a virtual network using Border Gateway Protocol (BGP) signaling, wherein the apparatus comprises a processor coupled to a transmitter and a receiver, wherein the processor is configured to support a first set of BGP capabilities, wherein the first set of BGP capabilities comprises at least one BGP capability, transmit a first Open message comprising the first set of BGP capabilities, receive a second Open message comprising a second set of BGP capabilities, wherein the second set of BGP capabilities comprises at least one BGP capability, receive a first BGP Update message that requests for the network to be joined to the virtual network, wherein the first BGP Update message comprises a plurality of Address Family Identifiers (AFI) routes, determine to either accept or reject the first BGP Update message, wherein the first BGP Update message is rejected when AFI routes are rejected, and transmit a second BGP Update message, wherein the second BGP Update message indicates either acceptance or rejection of the first BGP Update, wherein the network does not join the virtual network when the BGP Update request is rejected, wherein the network joins the virtual network when the BGP Update request is accepted, and wherein a quality of service (QoS) requirement are associated with the network when joining the virtual network.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
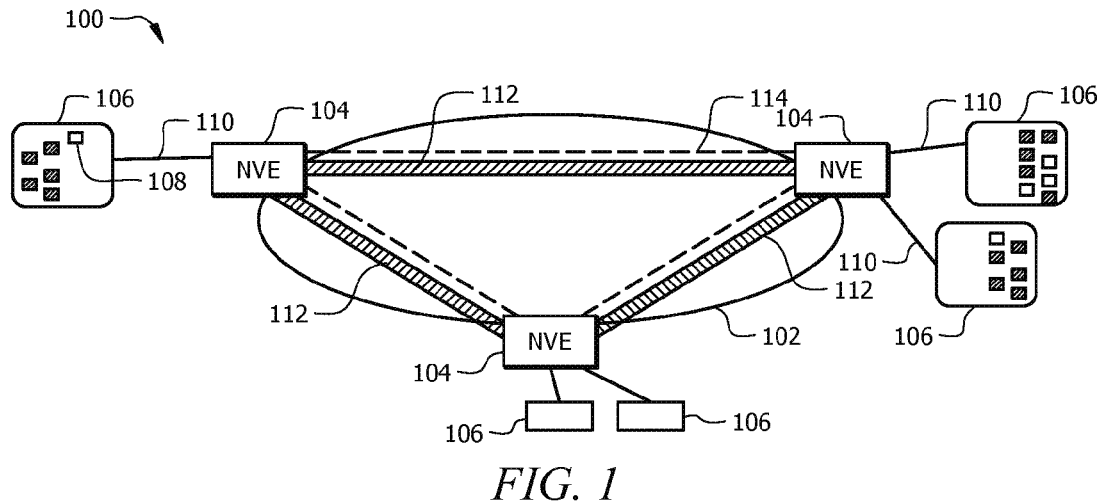
FIG. 1 is a schematic diagram of an example embodiment of a network that supports host join/leave to/from a virtual network.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Disclosed herein are a method, apparatus, and system to perform admission control for hosts in data centers and/or networks. This disclosure proposes using BGP to perform administrative control for joining and leaving a (VPN instance relating to hosts in a vDC or networks. BGP may be used to signal host-to-host connections and/or reachability information, advertise network VPN instances, associate QoS or bandwidth requirements with hosts or networks, and query host connectivity. The admission control enables hosts and/or networks to automatically join or leave a particular virtual service instance. A BGP may be adapted to signal an in-band request to join or leave a particular virtual service instance and have the network acknowledge the request.

BGP may signal via an in-band mechanism one or more routing information bases (RIBs) per specific vDC VPN. The RIB is identified by a combination of Address Family Identifier (AFI) and sub-address Family Identifier (SAFI), which hereafter is denoted as the AFI/SAFI identifier for a RIB.

The vDC VPN may be identified by a DC identifier, a VPN identifier (ID), a Security ID, and various combinations thereof. The VPN ID may be an integer or monotonically increasing value obtained from the VLAN port ID or other mechanisms. The Security ID may use a type-length-value (TLV) format where the type may represent a specific security protocol identifier (SPI) and the length may represent length of the value, and the value may include the SPI.

The BGP in-band signaling of the join and leave functions signals may be implemented using a capability, such as BGP Extended Communities, BGP Dynamic Capabilities, a BGP Join/Leave attribute, or an operational status messages. Each of these exchanges involves BGP signaling between two BGP peers. Prior to the in-band signaling, the BGP peers negotiate and setup a BGP connection via a BGP OPEN Capability. The negotiation sets up one feature to pass the Join/Leave VPN services using existing BGP services such as Extended Communities or BGP negotiated services. BGP negotiated services include, but are not limited to the BGP Dynamic Capabilities, the BGP Join/Leave VPN optional attribute, and BGP passing of status information (e.g. BGP advisory message).

The signaling involves sending a BGP message and receiving a response between two BGP peers. One BGP peer may be deemed the sender that requests to join the VPN. The receiver may accept or reject the request in a response. A leave request may be sent from either BGP peer (i.e. sender or receiver), and may be accepted or rejected by the BGP peer that receives the leave request. The signaling may use a 'treat-as-withdraw' capability that allows error processing of malformed BGP messages or the Update message's attributes for Extended Communities and the optional Join/Leave transitive. Signaling for some classes of errors may comprise rejecting the join request or a leave request.

A join request may be rejected when the BGP receiver rejects the reachability information. Reachability information may include but is not limited to: host addresses, host-to-host routes, network routes, MAC addresses, Ethernet (e.g. Institute of Electrical and Electronics Engineers (IEEE) or IEEE 802.1aq) 802.1Q VPNs, L3VPN information, and L2VPN auto-configuration information. After the BGP receiver accepts a join/leave request, validation of the join/leave signaling may occur to allow specific traffic flows between the BGP peers. Validation may include the policy validation of the RIBs AFI/SAFI pair, the VPN ID, and the Security ID. These and other features will be more clearly understood from the following detailed description taken in conjunction with the accompanying drawings and claims.

FIG. 1 is a schematic diagram of an example embodiment of a network 100 that supports host join/leave for a virtual network. Network 100 may comprise an underlay network 102, network virtual edges (NVEs) 104, servers 106, and virtual machines (VMs) 108. The underlay network 102 may be any physical network capable of overlaying multiple virtual networks, such as IP/MPLS networks, Ethernet networks, and data center networks. The underlay network 102 may be a network comprising a DC physical network, one or more local area networks (LANs), metropolitan area networks (MANs), and/or wide area networks (WANs). Additionally, the underlay network 102 may operate at Open Systems Interconnection (OSI) layer 2 or layer 3.

NVEs 104 may reside on network devices (i.e. BGP peers) such as routers, switches, bridges, and various combinations thereof. In FIG. 1, the NVEs 104 may reside externally from the servers 106. A host within network 100 may include servers 106, VMs 108, storage devices, data centers and other types of end devices that may originate data into or receive data from network 100. A host may be external to the underlay network 102. A server 106 may comprise VMs 108 that may belong to different virtual service instances (i.e. virtual networks). VMs 108 and servers 106 may be located in one data center or at different data centers. Virtual service instances (i.e., virtual networks) may be constructed using network virtual overlay (NVO3) instances, L2VPNs, L3VPNs, and/or any other overlay network technologies capable of using BGP.

As shown in FIG. 1, servers 106 (e.g. hosts) and NVEs 104 are external from each other and are not located within the same hardware. Servers 106 may be external to the underlay network 102 and virtual service instances, while NVEs 104 may reside on network devices at the edge of underlay network 102. A server 106 and a NVE 104 may use eBGP connection 110 to provide communication between the two BGP peers. Specifically, the eBGP connection 110 may be used to exchange information between a server 106 and the NVE 104 that enables servers 106 and/or VMs 108 (i.e. hosts) to automatically join or leave the virtual service instance. A server 106 may be configured to send a request to the local NVE 104 for VM 108 to participate to the virtual network. Persons of ordinary skill in the art are aware that eBGP connection 110 may be used to exchange information between other embodiments of ASes.

FIG. 1 also illustrates that overlay tunnels 112 may be implemented to transport data between NVEs 104 within a virtual network. Different types of overlay tunnels 112 may include but are not limited to MPLS tunnels, label switch path (LSP) tunnels, Generic Routing Encapsulation (GRE) tunnels, and IP tunnels. Different overlay tunnels 112 may be used depending on the type of virtual service instance implemented to transport data over the underlay network 102. As discussed above, iBGP connection 114 may communicate route population and other routing decision between NVEs 104.

Figure 2:
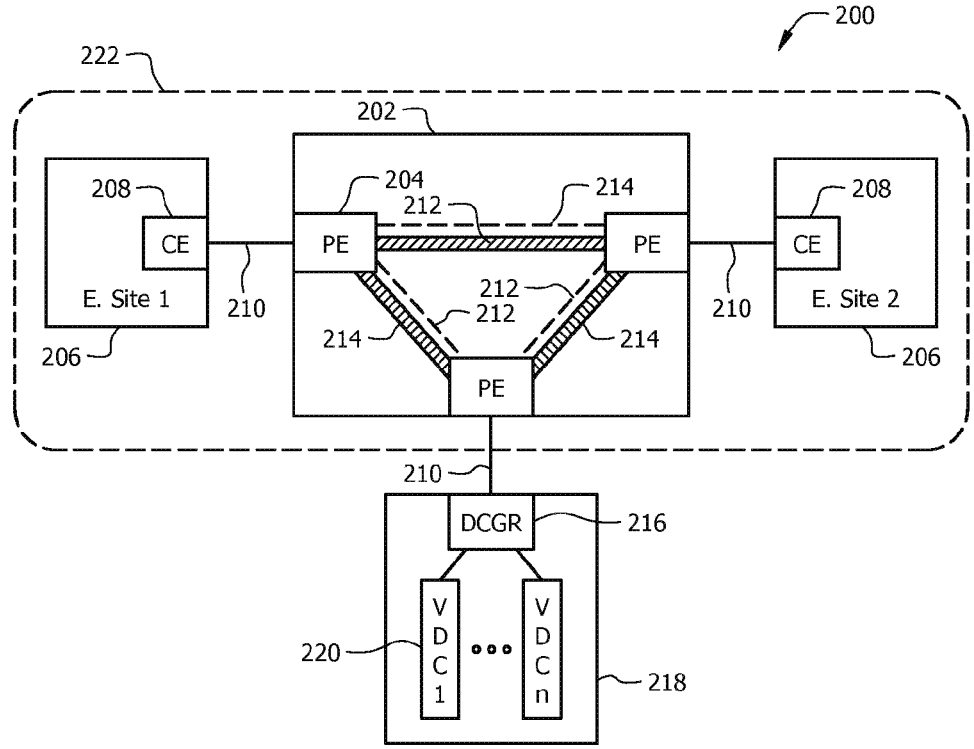
FIG. 2 is a schematic diagram of an example embodiment of a network that interconnects a VPN network with a data center service provider.

FIG. 2 is a schematic diagram of an example embodiment of a network 200 that interconnects a VPN network 222 with a DC service provider 218. Underlay network 202, overlay tunnel 212, BGP connection 210, and iBGP connection 214 are substantially the same as underlay network 102, overlay tunnel 112, eBGP connection 110, and iBGP connection 114, respectively. The VPN network 222 may be a private network, such as an enterprise's intranet that comprises site networks A and B 206. Site networks 206 may be mutually interconnected networks that do not depend on a VPN network for connectivity. Site network A 206 and site network B 206 may be physically located in different geographical locations, and thus may not be able to exchange communication without a VPN service instance. The two site networks A and B 206 may be connected using underlay network 202 provided by a network service provider. The underlay network 202 may interconnect site networks A and B 206 using a VPN service instance, such as L2VPN or L3VPN. In other embodiments, site networks 206 may be associated with more than one VPN service instances.

The site networks 206 with a VPN service instances, such as L3VPN and L2VPN, may include provider edge (PE) devices 204 and Customer Edge (CE) devices 208. CE devices 208 and PE devices 204 may be edge network devices (i.e. BGP peers), such as routers, switches, bridges, and various combinations thereof. These definitions are logical definitions, and do not imply any specific forwarding protocol. The PE device 204 may be attached to the CE device 208 via physical circuits or logical attachment circuits (AC). One or more CE devices 208 that may be coupled via an attachment circuit to one or more PE devices. Traffic filters may be configured and placed at the PE device 204 and CE device 208 to insure that traffic transiting between the links may be approved by the service provider and customer. PE devices 204 may be part of the underlay network 202, while CE device 208 may external to the underlay network 202. The PE device 204 and the CE device 208 may be managed by different administration systems. The eBGP connection 210 may facilitate communication between site networks 206 and the network service provider through a CE device 208 and a PE device 204. PE devices 204 may transport data via the VPN network 222 using overlay tunnels 212.

The DC service provider 218 may be coupled to VPN network 222 using a data center gateway router (DCGR) 216. A PE device 204 from the underlay network 202 may couple the DCGR 216 over a physical interface comprising a plurality of ACs. DCGR 216 may acts as multiple CE devices 208. The DC service provider 218 may comprise one or more vDCs 220 that provide computing, storage, and other network services. A vDC 220 may be a logical entity that may run on any combination of hardware within a physical site or hardware in multiple sites or on any virtualized networking devices. For example, virtualized networking devices may be host running in a hypervisor or attached to a virtual switch in a hypervisor. The use of the term vDC does not constraint the linkage of the logical entity to any set of physical or logical links.

One or more of the vDCs 220 may be allocated to the VPN network 222. The eBGP connection 210 may be used to exchange information between the PE device 204 and DCGR 216 to enable one more vDCs 220 to automatically join or leave the WAN VPN networks 202. Other example embodiments may also use the eBGP connection 210 between the PE device 204 and CE device 208 to enable hosts within a network to automatically join or leave the WAN VPN networks 202. An eBGP signal from the PE device 204 to the DCGR 216 may advertise the VPN route to DCGR 216, while an eBGP signal from the DCGR 216 to the PE device 204 may perform route admission control. In another embodiment where PE devices 204 are connected to PE devices 204, both PE devices 204 may perform route admission controls. Another embodiment of DC service provider 218 may allocate vDCs 220 to different VPN networks other than the VPN network 222 shown in FIG. 2.

Figure 3:
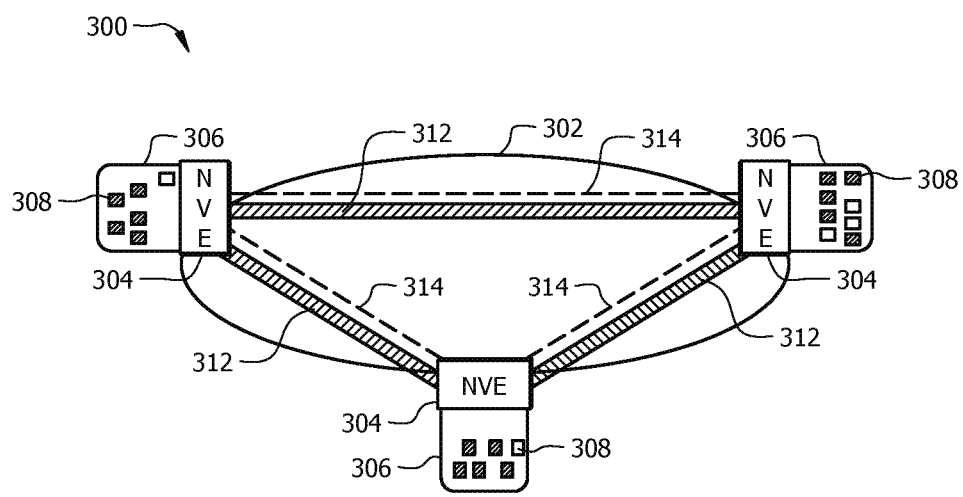
FIG. 3 is a schematic diagram of another example embodiment of a network that supports host join/leave to/from a virtual network.

FIG. 3 is a schematic diagram of another example embodiment of a network 300 that supports host join/leave for a virtual network. The network 300 may comprise an underlay network 302, NVEs 304, servers 306, VMs 308, overlay tunnels 312, and iBGP connection 314, which are substantially the same as underlay network 102, NVEs 104, servers 106, VMs 108, overlay tunnels 112, and iBGP connection 114, respectively. FIG. 3 illustrates that the NVEs 304 may reside on servers 306, and may not reside on external network devices connected to servers 306. Server 306 may comprise a server manager system responsible for creating NVEs, virtual networks, and VMs. The server manager system may also assign VMs to a virtual service instance (virtual network), while server software may ensure functionality and security. An NVE 304 (i.e. BGP peer) on a server 306 may use an iBGP connection 314 to exchange information with other remote NVEs 304 (i.e. BGP peer) to automatically join or leave the virtual service instance.

Figure 4:
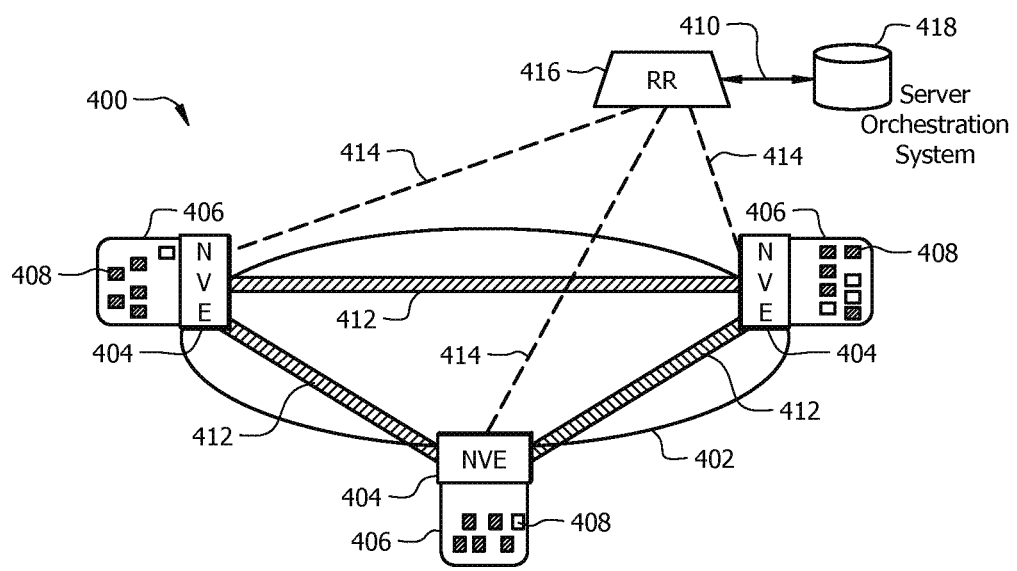
FIG. 4 is a schematic diagram of another example embodiment of a network that supports host join/leave to/from a virtual network using a router reflector.

FIG. 4 is a schematic diagram of another example embodiment of a network 400 that supports host join/leave to/from a virtual network using a router reflector 416. Network 400 may comprise a underlay network 402, NVEs 404, servers 406, VMs 408, overlay tunnel 412, and iBGP connection 414 are substantially the same as underlay network 302, NVEs 304, servers 306, VMs 308, overlay tunnel 312, and iBGP 314, respectively. Similar to FIG. 3, the NVEs 404 reside within servers 406s. Moreover, network 400 may further comprise a router reflector 416 coupled to a server orchestration system 418 via eBGP connection 410. The router reflector 416 may be used instead of implementing an iBGP mesh among the NVEs/PEs (i.e. BGP peers) as shown in FIGS. 1 and 3. eBGP connections 410 are substantially the same as eBGP connections 110.

FIG. 4 illustrates that the server orchestration system 418 may use eBGP connection 414 to inform the router reflector 416 about VM locations in a virtual network. The server orchestration system 418 may be responsible for managing all the servers and VMs, such as creating, deleting, and moving VMs. The server orchestration system 418 may also assign VMs or servers to a virtual network, such as a NVO3. The router reflector 416 may receive an update message from the server orchestration system 418 and forward the message to interested servers 406, peer groups, or other interested groups via iBGP connection 414. The NVE 406 may receive the update message and update the forwarding table. The router reflector 416 may not forward a message to the server orchestration system 418 when receiving an update message from an NVE 406. The eBGP connection 410 may be used to exchange information between router reflector 416 and the server orchestration system 418 to enable servers 406 and/or VMs 408 (i.e. hosts) to automatically join or leave the virtual network. The orchestration system may query the VM location and host-to-host connectivity and/or associate QoS or Bandwidth requirements by using eBGP.

Figure 5A:
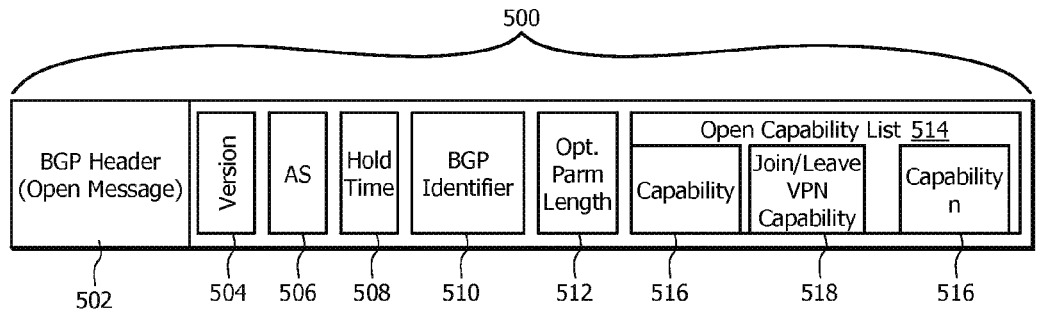
FIG. 5A is a schematic diagram of an example embodiment of a BGP Open message 500 with join/leave capability.

FIG. 5A is a schematic diagram of an example embodiment of a BGP Open message 500. BGP peers may be any network device that have been configured to run the BGP routing protocol, such as devices supporting NVEs, servers, PE devices, CE devices, and DCGRs shown in FIGS. 1-4. After the underlying transmission control protocol (TCP) is established, a BGP Open message 500 may be exchanged between two BGP peers to create a BGP connection. The BGP Open message 500 may comprise a header field 502, a version field 504, an AS field 506, a hold time field 508, a BGP identifier field 510, an optional parameter length field 512, and an optional parameter field (open capability list in FIG. 5A) 514. The header field 502 may comprise a header type field that may indicate the message type, a header length field that may indicate the length of the header, and a header marker field that may indicate the total length of the message. Other embodiments of BGP message types may include Open messages, Update messages, Keepalive messages, NOTIFICATION messages, Dynamic Capability Messages, and Route Refresh Messages, and Advisory Messages. The header type field, header length field, and header marker field may be about one octet long, two octets long, and 16 octets long, respectively.

The version field 504 may about one octet long and may be an unsigned integer that indicates the protocol version of the message. For example, the version field 504 may provide a BGP version of four. The autonomous system field 506 may be about two octets long and may indicate the autonomous system number of the sending BGP peer. The hold time field 508 may be about two octet longs and may be an unsigned integer that indicates the number of seconds the sending BGP proposes for the value of the hold timer. The BGP identifier field 510 may be about four octets long and may be used to identify the IP address assigned to the sending BGP peer. The optional parameter length field 512 may be about one octet long and may be an unsigned integer that indicates the total length of the optional parameter field 514.

The optional parameter field 514 may vary in length depends on the number of different parameters encoded into the BGP Open message 500. One of the optional parameters may be a Capabilities Optional Parameter 516 that facilitates passing new capabilities within a BGP session, which may be denoted as Open Capability advertisement as defined in IETF RFC 5492, which is incorporated herein as if reproduced by its entirety. The Capabilities Optional Parameter 516 contains a list of capabilities 516 supported by the BGP peer. The Internet Assigned Numbers Authority (IRNA) may define and register capabilities in the IRNA Capability Code (found at [www.iana.org/assignments/capability]), which is incorporated here as if reproduced by its entirety. Some of these capability numbers are reserved for private use between two BGP peers. These private use capabilities may not be found in the IRNA Capability Code. Two BGP peers may exchange capabilities to determine the set of common capabilities for a BGP session. For example, the Join/Leave Open (VPN in FIG. 5A) Capability 518 may be one of the capabilities included in the optional parameter field 514.

Figure 5B:
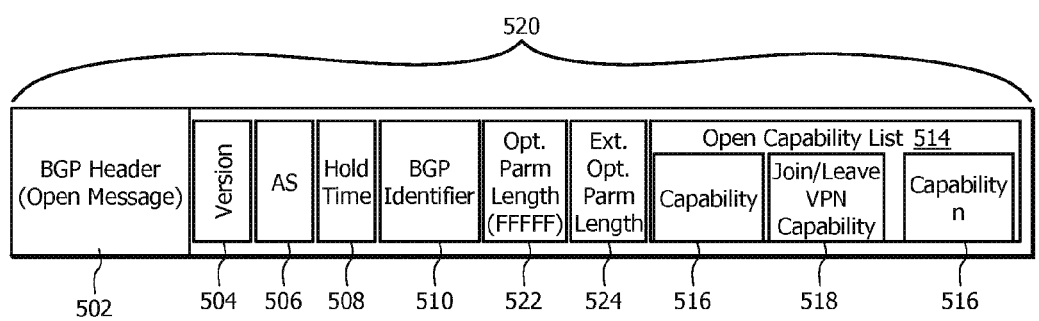
FIG. 5B is a schematic diagram of another example embodiment of a BGP Open message with join/leave capability.

FIG. 5B is a schematic diagram of another example embodiment of a BGP Open message 520. The BGP Open Message 520 may comprise an optional parameter length 522 and an Extended Optional Parameters length field 524 that differs from the BGP Open Message 500. The optional parameter length 522 may include a value of 255 (0xFF) that indicates extending the format of the BGP Open Message 520. The Extended Optional Parameters fields 524 may be about two bytes long and may be used to indicate the extended length of the optional parameter 514. The Extended Optional Parameter field 524 may follow the optional parameter length 522 and ends before the start of the Open Capability list 514. The other fields in the BGP Open Message 520 are substantially the same as BGP Open Message 500.

Figure 5C:
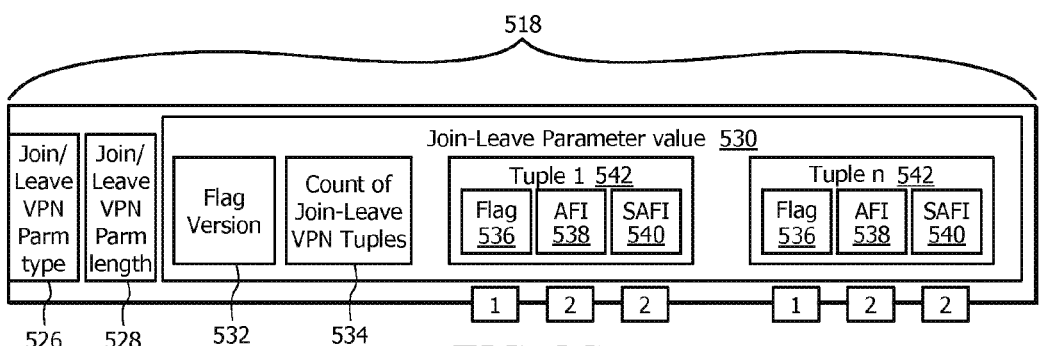
FIG. 5C is a schematic diagram of an example embodiment of a Join/Leave Capability field.

Both BPG Open Messages 500 and 520 may comprise a Join/Leave Capability field 518 within the optional parameter 514. FIG. 5C is a schematic diagram of an example embodiment of a Join/Leave Capability field. As shown in FIG. 5C, the Join/Leave Capability field 518 may comprise a Join/Leave parameter type 526 that is about one octet long, the Join/Leave parameter length 528 that is about one octet long, and the Join/Leave parameter value 530. The Join/Leave parameter type 526 may indicate the capability parameter is a Join/Leave Capability. The Join/Leave parameter length 528 may indicate the length of the join-leave parameter value 530.

The Join/Leave parameter value 530 may vary in size and may comprise a flag version field 532 that is about one octet long, the count of Join/Leave VPN tuples field 534 that is about one octet long, and a plurality of tuples 542 that are about five octets long. The flag version field 532 may indicate the type of encoding used for the Join/Leave parameter value 530. One embodiment may have the flag version field 532 set to zero for a version zero Join/Leave parameter encoding. The count join/leave tuples field 534 may indicate the number of tuples 542 (e.g. n tuples) within the Join/Leave parameter value 530. Each tuple 542 may be associated with a specific virtual network.

Figure 5D:
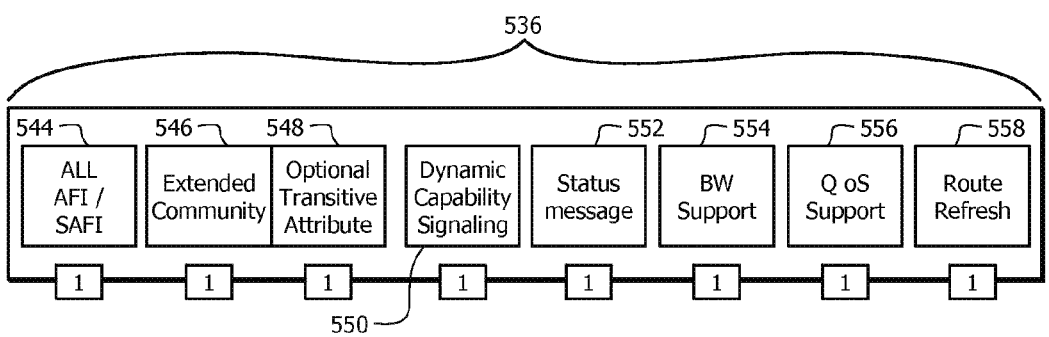
FIG. 5D is a schematic diagram of an example embodiment of a flag field.

FIG. 5D is a schematic diagram of an example embodiment of a flag field 536. Each tuple 542 may comprise a flag field 536 that is about one octet long, an AFI field 538 about two octets long, and a SAFI field about one octet long. As shown in FIG. 5D, the AFI field 538 and SAFI field 540 may be used the RIB for the associated virtual network. The flag field 536 may comprise an All AFI/SAFI flag 544, an Extended Community flag 546, an Optional Transitive Attribute flag 548, a Dynamic Capability Signaling flag 550, a status message flag 552, a bandwidth support flag 554, and a Quality of Service (QoS) flag 556, and a Route Refresh Flag 558. Each flag 544, 546, 548, 550, 552, 554, 556, and 558 may be about one bit long. The Extended Communities flag 546 may indicate that the BGP peer sending the BGP Open message 500 and 520 will use the Extended Communities attribute in the BGP Update message to pass the Join/Leave VPN information. The Optional Transitive attribute flag 548 may indicate that the BGP peer sending the BGP Open message 500 and 520 may use the Join/Leave VPN BGP transitive attribute to pass the BGP bit value. The dynamic capability signaling flag 550 may indicate that the dynamic capability mechanism may be used to pass the join/leave information. This join/leave information may be the dynamic adding of the capability or the actual VPN join/leave information. The status message flag 552 may indicate that a BGP status message may be used to pass join/leave information. The BW support flag 554 may indicate that bandwidth needs that may be signaled in the join/leave information. The QoS support Flag 556 may indicate that the QoS information may be passed in the VPN. Person of ordinary skill in the art are aware that other forms of the flag field 536 can be utilized for the join/leave function.

Referring to FIGS. 5C and 5D, when the All AFI/SAFI flag 544 is set (e.g. data value of one), the value may indicate all AFI field 538 and SAFI field 540 in the corresponding tuple 542 may be ignored. For example, when the ALL AFI/SAFI flag 544 is set in the flag word of tuple n 542, then the data values within the AFI field 538 and SAFI field 540 for tuple n 542 may be ignored. When the All AFI/SAFI flag 544 is not set (e.g. data value of zero), then the bytes in the AFI field 538 and SAFI field 540 bytes of the tuple 542 are appropriate for the flags. All AFI field 538 and SAFI field 540 not previously set for the associated virtual network may be set to the flag field 536 based on local policies.

Figure 6:
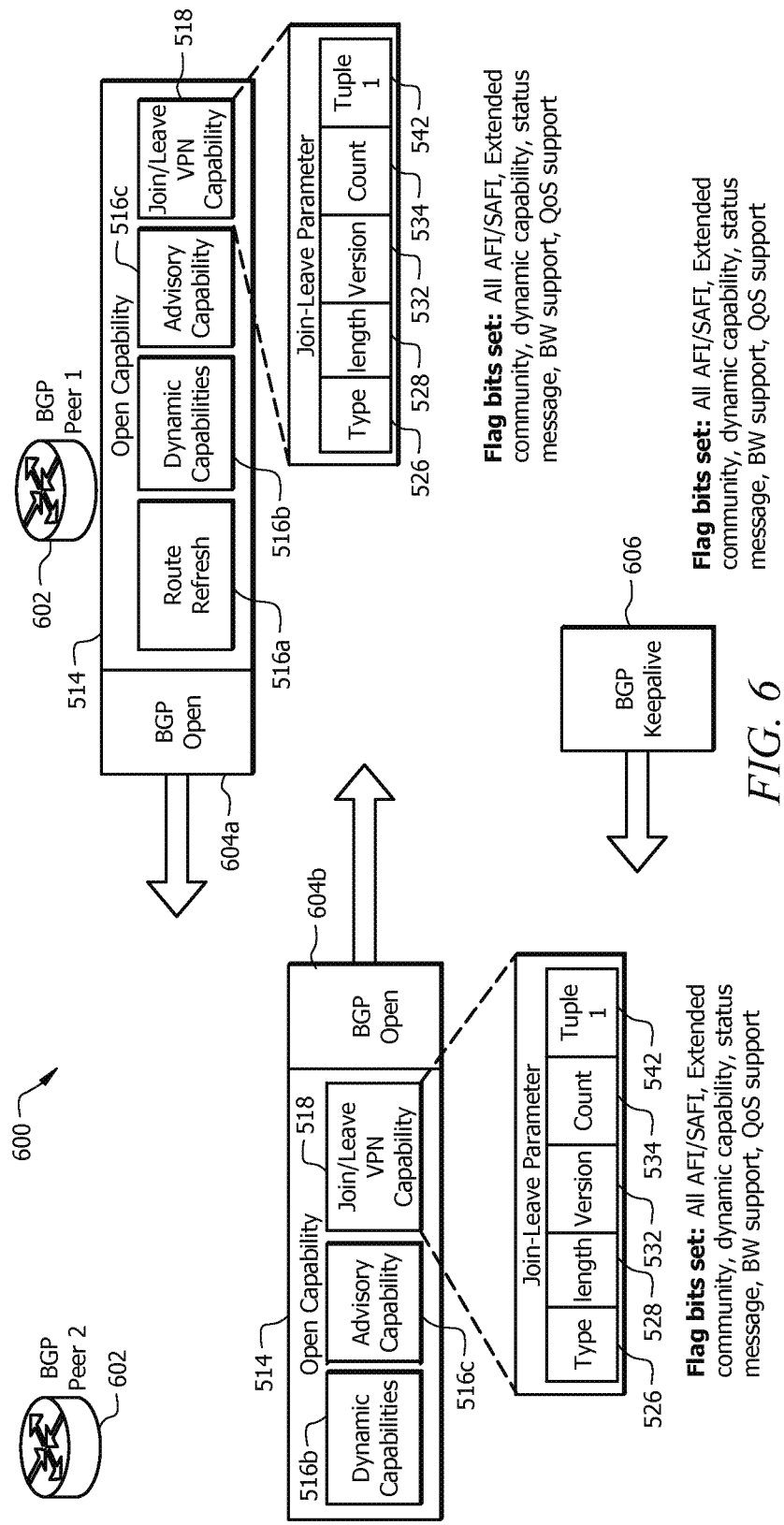
FIG. 6 is a schematic diagram of an example embodiment of a BGP Open Exchange process.

FIG. 6 is a schematic diagram of an example embodiment of a BGP Open Exchange process 600. BGP Peer 1 602 may send a BGP Open Message 604a with an Open Capability list 514 that includes the capabilities route refresh capability 516a, dynamic capabilities 516b, advisory status capability 516c, and Join/Leave VPN Capability 518. The values shown in Join/Leave VPN Capability 518 for tuple 1 542 has flags set to ALL AFI/SAF, Extended community, Dynamic Capability, status message, BW support, and QoS Support (See FIG. 5D). Upon reception of 604a, BGP Peer 2 602 determines based on local policy what support it has for Join/Leave VPN capabilities and sends back a second BGP Open Message 604b as a response for the BGP peer 1 602. BGP Open Message 604b may include the Join/Leave VPN Capability 518, the Advisory Capability 516c, and the Dynamic Capability 516b, but not the Route Refresh Capability 516a. The inclusion or removal of capabilities, such as the Route Refresh Capability 516a may not impact the Join/Leave VPN Capability 518 in the BGP Open Message 604b sent by BGP Peer 2. As shown in FIG. 6, the values for the tuple 1 in both BGP Open Message 604a and b are the same (e.g. all flags are set). After receiving the BGP Open message 604b from BGP Peer 2 602, the BGP Peer 1 602 may respond to BGP Peer 2 602 with a BGP Keepalive message 606.

Figure 7:
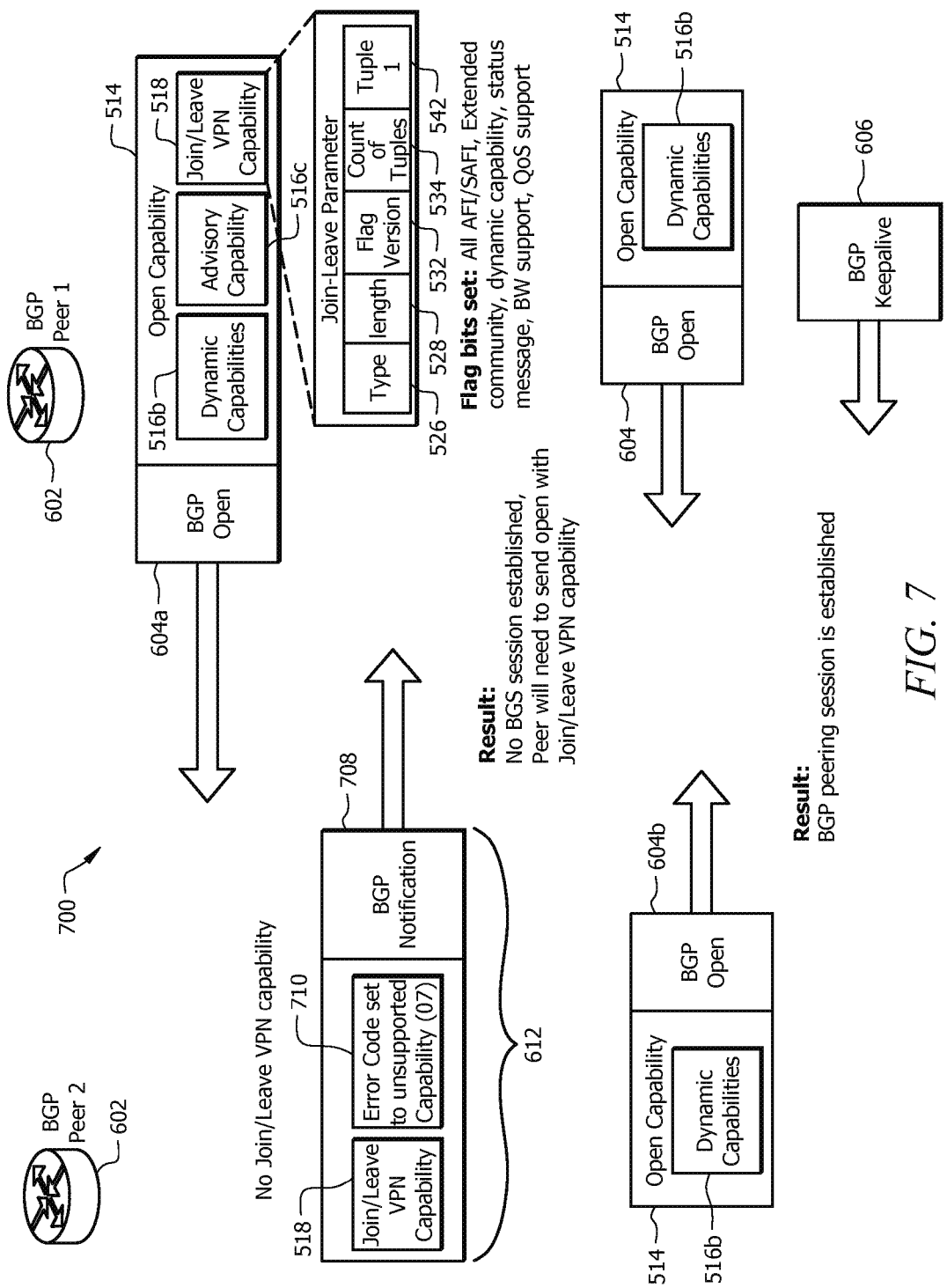
FIG. 7 is a schematic diagram of another example embodiment of a BGP Open Exchange process.

FIG. 7 is a schematic diagram of another example embodiment of a BGP Open Exchange process 700. BGP Peer 1 602 sends to BGP Peer 2 602 an BGP Open Message 602 with Dynamic Capability 516b, Advisory Capability 516c, and Join/Leave VPN Capability 518. FIG. 7 also illustrates that the flag bits set in tuple 1 542 are All AFI/SAFI, Extended Community, Dynamic Capability, Status Message, BW support, and QoS support (See FIG. 5D). BGP Peer 2 602 may not support the Join/Leave VPN Capability 518 or the Advisory Capability 516c, and sends a notification message 708 with an error code 710 and bytes from the Join/Leave Capability 518. As shown in FIG. 7, the BGP Peer 2 602 may not establish a BGP peer session with BGP Peer 1 602 to support the Join/Leave VPN Capability 518. BGP Peer 1 602 may continue to establish a BGP peer session by sending another BGP Open Message 604 with acceptable Open Capabilities 514. In this non-limiting example, the acceptable Open Capability 514 may be the Dynamic Capability 518. BGP Peer 2 602 may subsequently send a BGP Open Message 604b in response with a Dynamic Capability 516b to create the BGP peer session. The BGP Keepalive message 606 may then be sent by BGP Peer 1 602.

Figure 8:
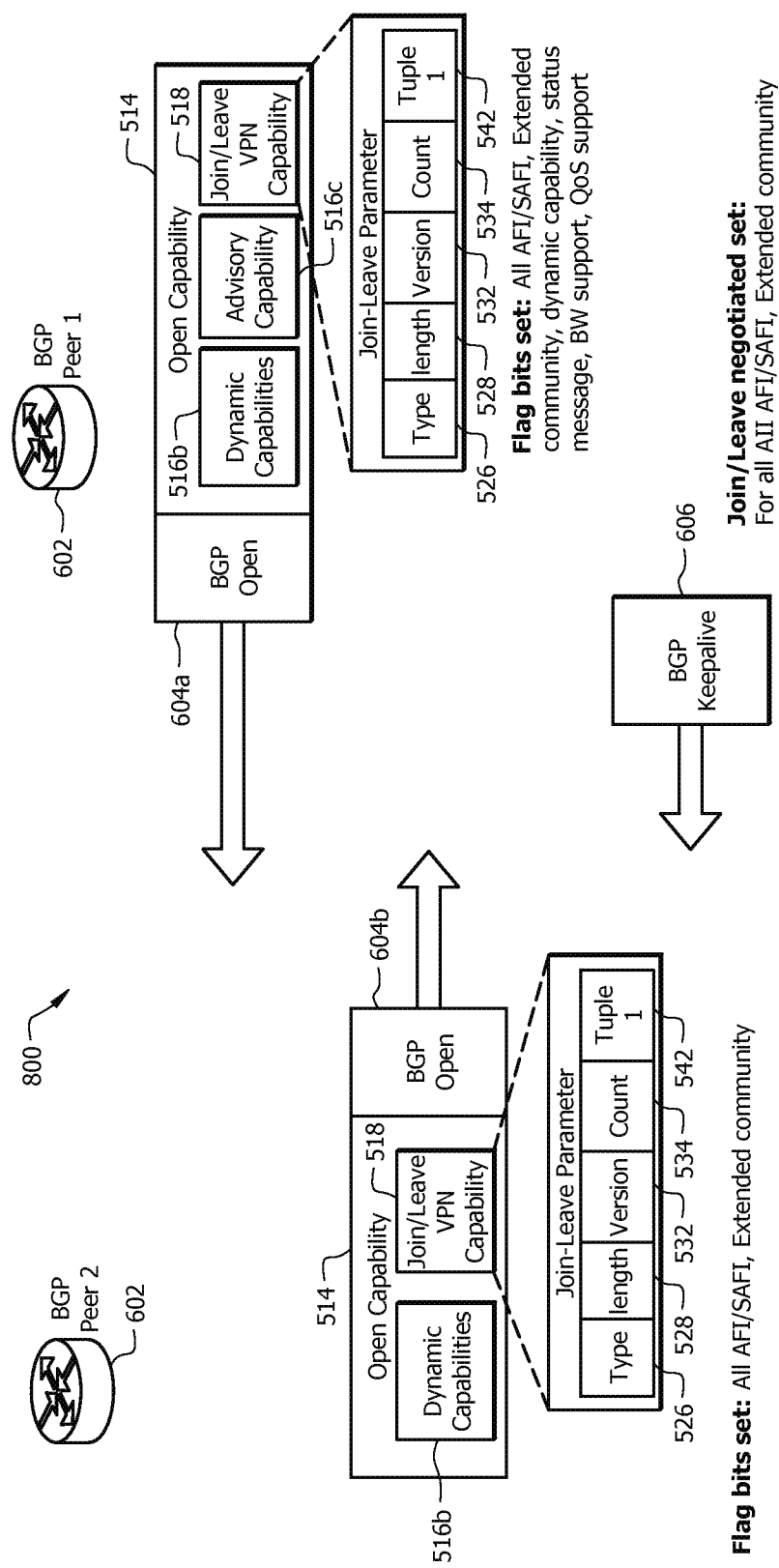
FIG. 8 is a schematic diagram of another example embodiment of a BGP Open Exchange process.

FIG. 8 is a schematic diagram of another example embodiment of a BGP Open Exchange process 800. FIG. 8 illustrates the ability of the Join/Leave VPN capability 518 to negotiate the features within the BGP negotiation. BGP Peer 1 602 may send a BGP Open message 602 with the Dynamic Capabilities 516b, 516c and the Join/Leave VPN Capability 518. Tuple 1 542 within the Join/Leave VPN Capability may set the flag bits for All AFI/SAFI, extended community, dynamic capability, status message, BW support, and QoS support fields (See FIG. 5D). BGP Peer 2 602 may be based on a user policy signal and may only exchange the Join/Leave VPN information via Extended Communities, and may not support Bandwidth information or QoS information regarding VPNs. To signal this, BGP Peer 2 602 sends the BGP Open Message 604b with the Join/Leave VPN Capability 518 and the Dynamic Capability 516b. The Join/Leave VPN Capability 518 within the BGP Open Message 604b may set the flag in tuple 1 542 for All AFI/SAFI and Extended Community fields. BGP Peer 1 602 upon receiving the BGP Open message 604b accepts the Join/Leave VPN exchange and may use only the Extended Community feature. BGP Peer 1 602 may then send the BGP Keepalive message 606 once establishing the BGP peer session.

Figure 9A:
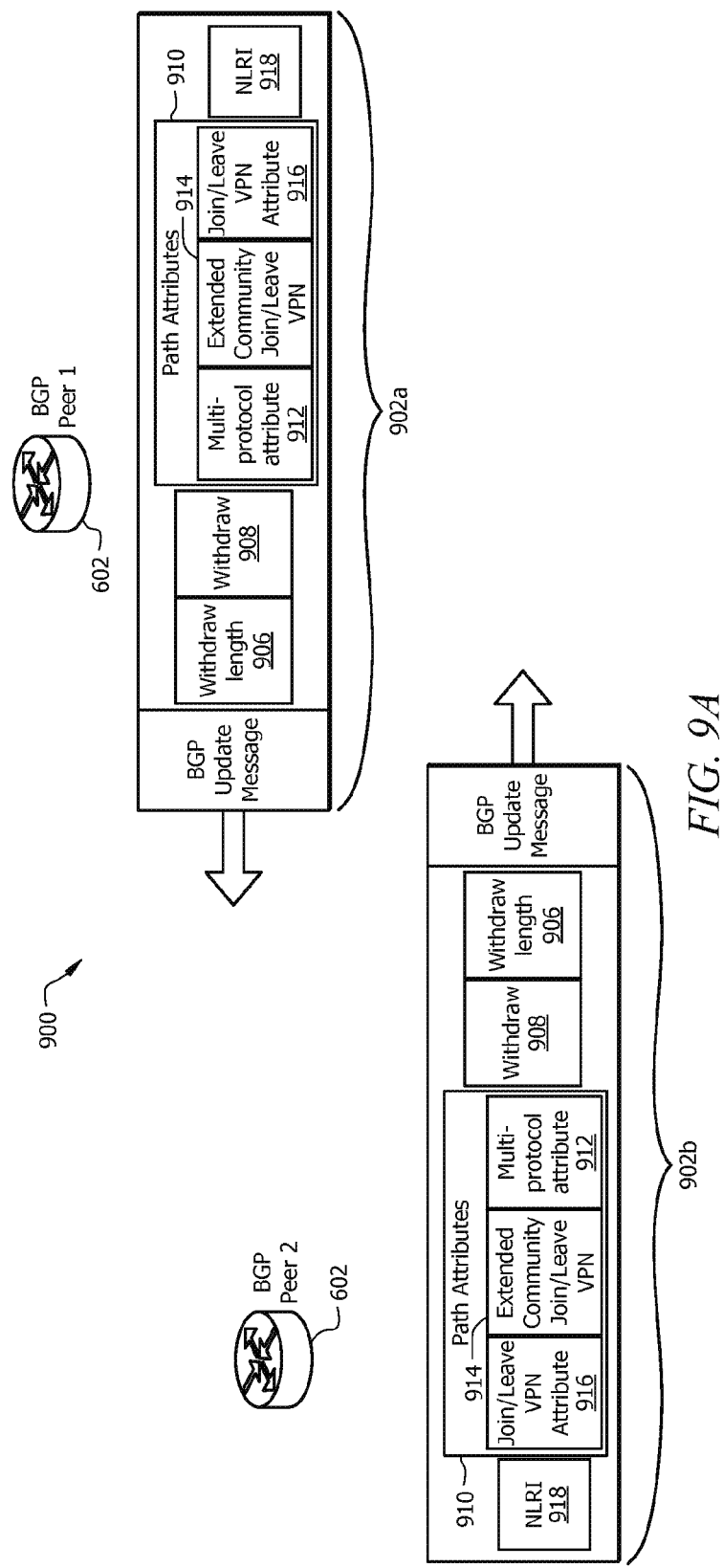
FIG. 9A is a schematic diagram of an example embodiment of a BGP exchange process using BGP Update messages.

FIG. 9A is a schematic diagram of an example embodiment of a BGP exchange process 900 using BGP Update messages 902. FIG. 9A shows BGP Peer 1 602 sending a BGP Update message 902a that comprises the normal BGP Update fields of Withdraw length 906, Withdraw Field 908, BGP Path Attributes 910, and network layer reachability information (NLRI) 918. The BGP Path Attributes 910 may include three different BGP PATH Attributes: Multi-protocol Reachability attribute 912, an Extended Community Join/Leave VPN 914, and the Join/Leave VPN attribute 916. Persons of ordinary skill in the art are aware of these attributes. After receiving the BGP Update message 902a, BGP Peer 2 602 sends back another BGP Update message 902b. There is no direct correspondence between the two packets messages required except for the Extended Community Join/Leave VPN 914 and the Join/Leave VPN attribute 916. In this non-limiting example, the VPN join requests within the BGP Update message 902a may be sent by BGP Peer 1 602 via the Extended Community Join/Leave VPN 914 and the Join/Leave VPN attribute 916. BGP Peer 2 602 may respond by sending BGP Update message 902b comprising Extended Community Join/Leave VPN 914, and the Join/Leave VPN attribute 916. A request/response pair may be linked by the VPN identifiers (i.e. the DC ID, VPN ID, and Security ID) and need not be transmitted. BGP transport mechanism, such as TCP with Message Digest5 (MD5) may be used to keep order of the different messages.

Figure 9B:
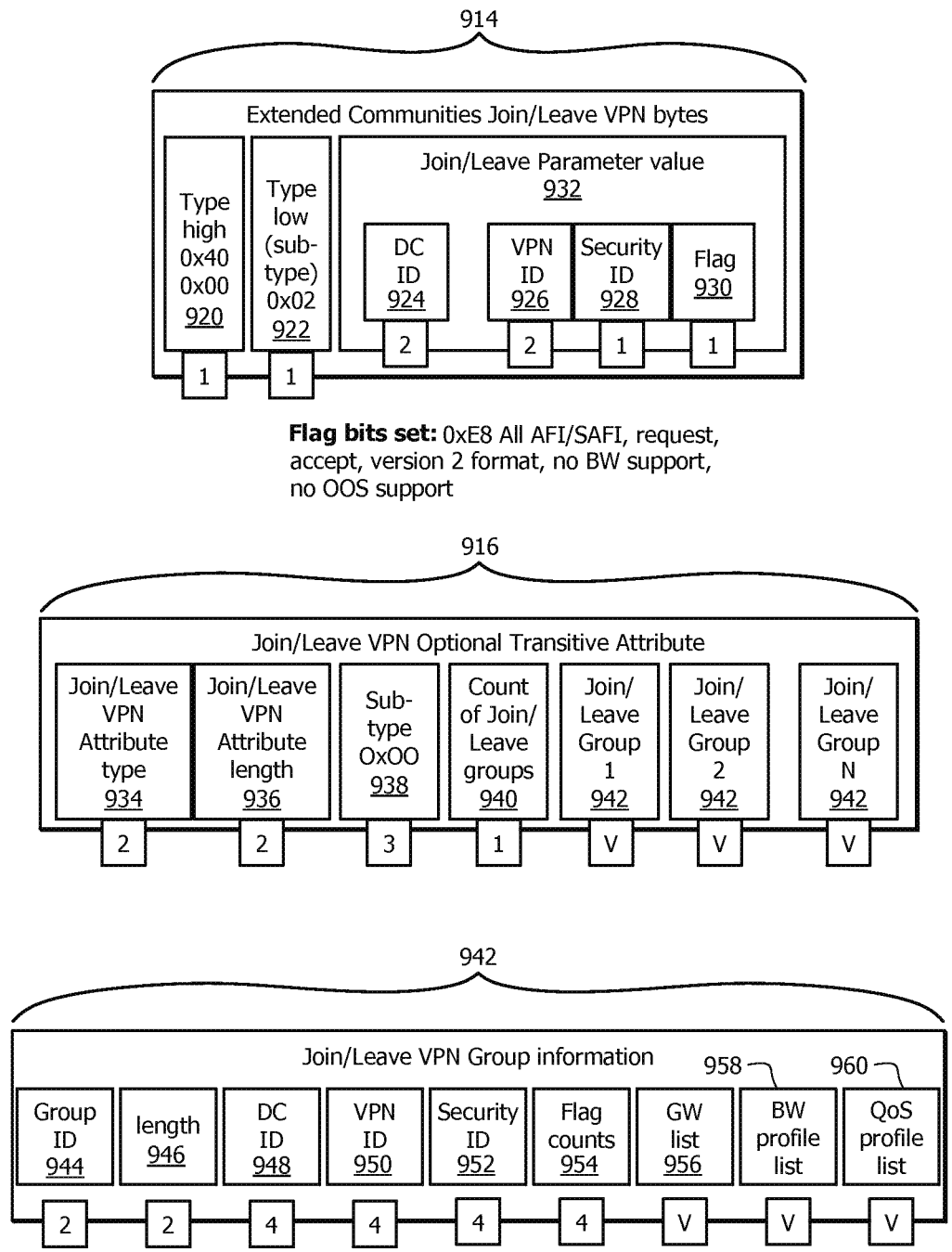
FIG. 9B is a schematic diagram of an example embodiment of an Extended Community path attribute encoded with Join/Leave information and a Join/Leave VPN attribute.

As shown in FIG. 9A, Extended Community Join/Leave VPN 914 and the Join/Leave VPN attribute 916 may be carried along with the NLRI field 918 during the BGP session. This allows BGP Peer 1 602 and BGP Peer 2 602 to perform administrative control relating to VPN when needed, rather than loading the policy prior to the need for the policy. A VPN policy may contain a range of hundreds to tens of thousands of entries for the policy. The automatic signaling may also set-up security signaled by the Security ID 928 as shown in FIG. 9B. All types of reachability may be filtered by the vDC until the VPN is set-up a saving traffic load for the vDC internal network. The reachability information may include both reachability information passed in the BGP Update messages 902 a and b or from packet flows which are local to the vDC. In an embodiment where the BGP Peer 2 602, in FIG. 9A is at a PE device, the automatic signaling may load the policy of all types of BGP filtering, packet filter, and flow filtering. Moreover, BGP Update messages 902 a and b may transfer many bytes of BGP Join/Leave VPN along with BGP NLRI using a length of about 4,096 octets and the extended BGP packet length of about 65,535 octets. The in-band processing allows synchronization of data flow with automatic policy insertion.

FIG. 9B is a schematic diagram of an example embodiment of an Extended Community path attribute 914 encoded with Join/Leave information and a Join/Leave VPN attribute 916. The Extended Community path attribute 914 may be encoded as a BGP Opaque Extended community. Extended Community path attribute 914 encoded with Join/Leave Information may comprise a standard type high field 920 that is about one byte long and a type low field 922 about one byte long. The type low field 922 may be followed by the Join/Leave parameter value 932 about six octets long. The Join/Leave parameter value 932 may comprises a DC ID 924 about two octets long, a VPN ID 926 about two octets long, a Security ID 928 about one octet long, and a flag byte 930 about one octet long. The DC ID 924, VPN ID 926, and Security ID 928 create a unique identifier for identifying the in-band service VPN joins/leaves. The high type filed 920 and low type field 922 may be used to indicate the type of Extended Community path attribute. The DC ID 924 may identify a vDC, while the VPN ID 926 identifies a VPN, and the Security ID 928 identifies security specific identifier. An example of encoding the DC ID 924, the VPN ID 926, and the Security ID 928 may be as follows: the DC ID 924 may be set to 0x0100, the VPN ID 926 may be set to 0x0020, and a Security ID may be set to 0x30. FIG. 9B uses the flag byte 930 to indicate the VPN request is for all AFI/SAFIs, a join request, looking for an accept, version 0 format, with no Bandwidth support requested, and no QoS support requested and route. The Extended Community path attribute 914 will be discussed in further detail below.

Another embodiment of the flag byte 930 may be used as a response. For example, in FIG. 9A, BGP peer 2 602 may send a BGP Update message 902b to BGP Peer 1 602 as a response. In this case, the VPN may be also identified by the same DC ID 924, the VPN-ID 926, and Security ID 928 (See FIG. 9B) using the same values (i.e. 0x0010, 0x0020, and 0x30 respectively). However, the flag byte 930 may be configured for the response to indicate a response and accept. After BGP Peer 1 602 receives this information, BGP Peer 1 602 may know that the automated set-up for the VPN has been completed on BGP peer 2 602. The embodiment may also be configured to use an optional timing out of the request/response sequence based on local configuration. The flag byte 930 encoding will be discussed in more detail in FIG. 10.

FIG. 9B also illustrates an example embodiment of the Join/Leave VPN attribute 916. The Join/Leave VPN attribute 916 may be a Join/Leave VPN Transitive attribute comprising an attribute type 934 about two octets long, an attribute length 936 about two octets long, a sub-type field 938 about three octets long, a count of join/leave groups field 940 about one octet long, and a sequence of join/leave group fields 942 with variable lengths. The attributes type 934 may indicate the type of optional transitive attribute, while the attribute length 936 may indicate the length of the Join/Leave VPN attribute 916. The sub-type field 938 may be used to allow for additional group of the Join/Leave VPNs. One embodiment may encode each group field 942 as a sub-type 0.

The encoding of group field 942 may comprise a Group ID 944 about two octets in length, a length field 946 about two octets in length, a DC ID 948 about four octets in length, a VPN ID 950 about four octets in length, a Security ID 952 about 4 octets in length, a flag counts field 954 about four octets in length, a gateway list 956 with a varying length, a bandwidth profile list 958 with varying length, and a QoS Profile list 960 with a varying length. The flag count field 954 may include a join/leave VPN flag octet, a gateway count octet, a count of bandwidth profiles, and a count QoS profiles. An example of how the group 942 may be encoded with a DC ID x0020, VPN ID x0030, Security ID x40, and the flag count field 954 with flags bits set for IPv4/unicast SAFI with VPN join requested, looking for acceptance, with version 0 of the format, no bandwidth support, no QoS support, one gateway hint, no bandwidth profiles (set using a flag value of zero), no QoS profiles (set using a flag value of zero), and a gateway hint of 200.2.1.3/32 IPv4. Another embodiment may be to encode the group as a responding join/leave attribute. The difference in encoding from the above example is that the flag bit is set for response instead of request. The details will be discussed in more detail in FIG. 10.

Encoding the group field 942 may allow a BGP peers to send a hint of available gateways for load sharing. For example, in FIG. 9A, BGP Peer 1 602 may send BGP Peer 2 602 a hint for available gateways for load sharing of traffic. When BGP Peer 2 902 confirms the gateways sent, BGP Peer 1 602 may spread the policy to load share between the two points in a network, knowing that BGP Peer 2 602 may also set-up the same policy. In addition, if the gateways sent in BGP Peer 2 602 gateway lists are not echoes of the BGP Peer 1 602 gateways, these gateways may be used as hints for BGP peer 2 602. All hinted gateways may be sent by either BGP Peer 1 602 to BGP Peer 2 602, or BGP Peer 2 602 to BGP Peer 1 602 are hints that can be validated against the receiving BGP peer's local policy.

Figure 10:
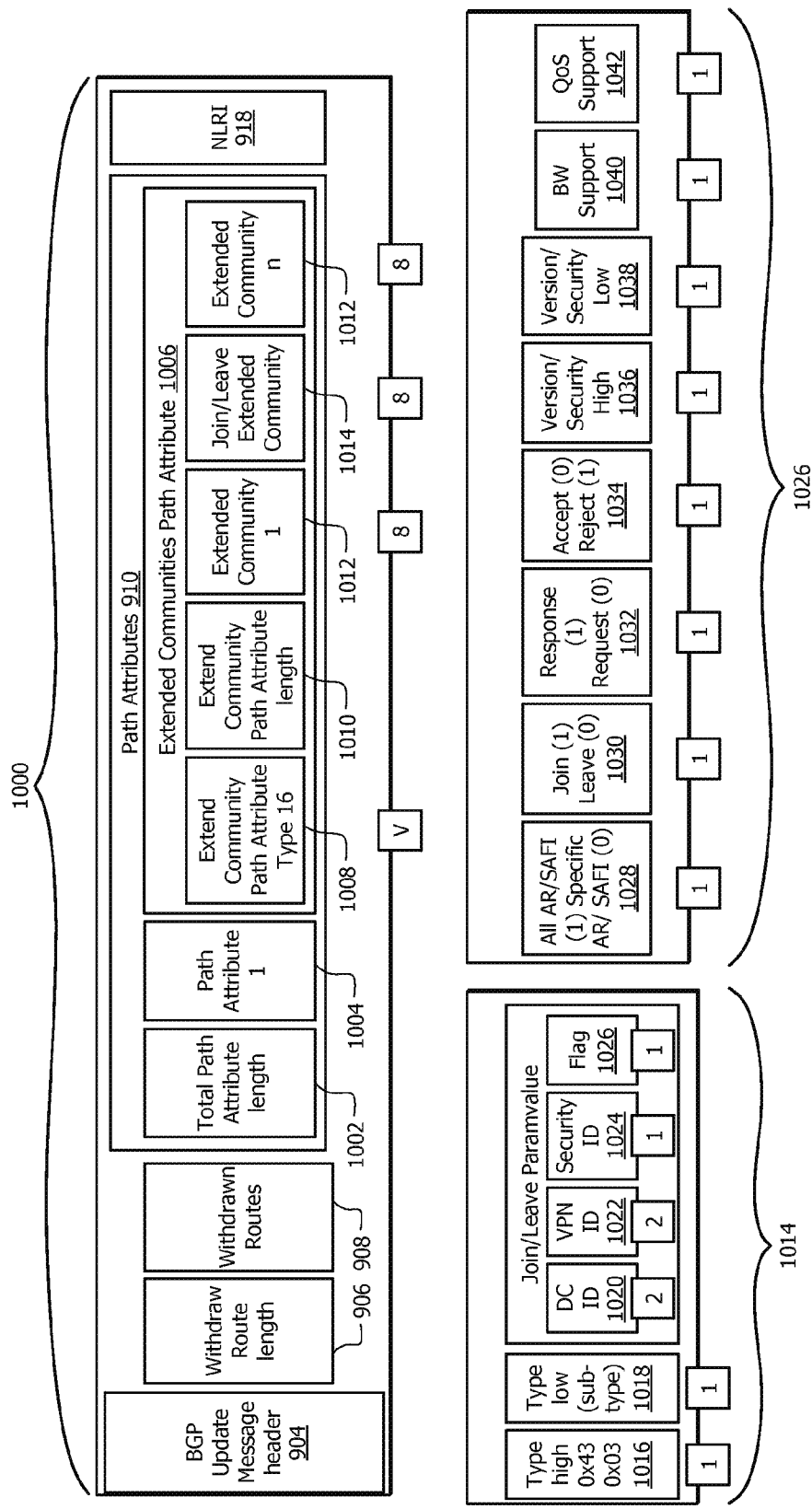
FIG. 10 is a schematic diagram of another example embodiment of a BGP Update message.

FIG. 10 is a schematic diagram of another example embodiment of a BGP Update message 1000. The BGP Update message 1000 may comprise a BGP Update Message header 904, withdraw route length 906, withdrawn routes 908, path attributes 910, and NLRI 918. Extended Communities Path Attribute 1006 may be encoded with the Extended Communities Path Attribute Type 1008, length of path attribute 1010, a sequence of communities 1012, and Join/Leave Extended Community 1014. Extended Communities Path Attribute Type 1008 may be variable in length, and the sequence of communities 1012 and Join/Leave Extended Community 1014 may be about eight octets long. Including the join/leave functionality over the Extended Communities filed may allow encoding across multiple BGP Update fields.

The Join/Leave Extended Community function 1014 may be encoded as an Opaque Extended community that comprises the type high field 1016, the type low filed 1018, the DC ID 1020, VPN ID 1022, Security ID 1024, and the Flag ID 1026, which are similar to fields 920, 922, 924, 926, 928, and 930 from FIG. 9B, respectively. The flag byte field 1026 may comprises an All/SAFI flag 1028, a Join/Leave flag 1030, a response/request flag 1032, and accept/reject flag 1034, a version/security high flag 1036, a version/security low flag 1038, a BW support flag 1040, and a QoS support flag 1042, all of which are about one bit long. The All AFI/SAFI flag in 1028 allows a single entry to support all AFI/SAFI. If other more specific AFI/SAFIs are added, they will be treated as more specific entries for AFI/SAFI set-up in the VPN join/leave interaction. The Join/Leave flag 1030 indicates whether the BGP Update message is a join/leave request or response. In one embodiment, when the Join/Leave flag 1030 is set to data value "1," the BGP Update message is a join request, while when the data value is "0" the BGP Update message is a leave request. The response/request flag 1032 may indicate whether this is a request (e.g. data value "0") or a response (e.g. data value "1") in the exchange. The accept/reject flag in 1034 may indicate whether a request has been accepted (e.g. data value "0") or rejected (e.g. data value "1"). The default value may be to the accept/reject flag to "accept". The version/security high 1036 and version/security low in 1038 may provide a two bit version field that indicates the version of the flag. The BW support flag 1040 indicates whether bandwidth support is requested. The QoS support flag 1042 may indicate whether QoS Support is requested.

Figure 11:
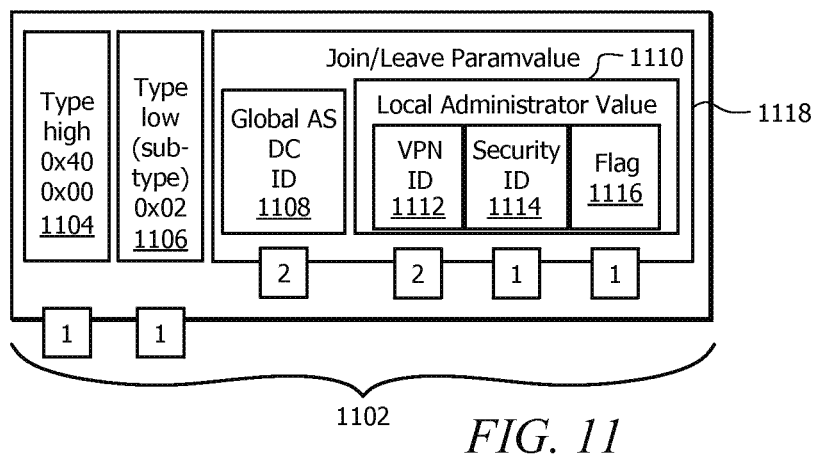
FIG. 11 is a schematic diagram of another example embodiment of a BGP Update message using the Extended Communities format.

FIG. 11 is a schematic diagram of another example embodiment of a BGP Update message using the Extended Communities format. The BGP Join/Leave VPN Extended Community field 1102 may have a 2-byte AS Route Target Extended Community format. The Extended Community field 1102 may be encoded in a variety of embodiments depending on the type of VPN. Type high fields 1104 and type low fields 1106 may be substantially the same as the type high fields 1016 and type low fields 1018, respectively. However, type high field 1104 may have a data value of 0x40 or 0x00, and type low field 1106 may have a data value of 0x02. The BGP Join/Leave VPN Extended Community field 1102 may also comprise a join/leave parameter value 1118. The join/leave parameter value 1110 may comprise a DC ID in the Global AS field in 1108, a VPN ID 1112, Security ID 1114, and the Join/Leave flag 1116. The VPN ID 1112, Security ID 1114, and the Join/Leave flag 1116 may be within the local administrator value. In a similar fashion, DC ID in the Global AS field in 1108, a VPN ID 1112, Security ID 1114, and the Join/Leave flag 1116 may be similar to fields 1020, 1022, 1024, and 1026 shown in FIG. 10, respectively. Another embodiment of the BGP Join/Leave VPN Extended Community field 1102 may be a two byte AS route origin that encodes the type high field 1104 with data values of 0x00 or 0x02, and encodes the type low field 1106 encoded with data values of 0x03.

Figure 12:
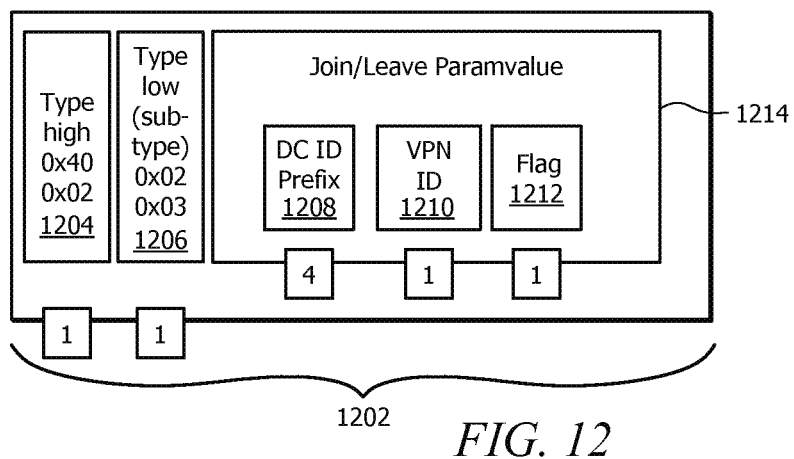
FIG. 12 is a schematic diagram of another example embodiment of a BGP Update message using the Extended Communities format.

FIG. 12 is a schematic diagram of another example embodiment of a BGP Update message using the Extended Communities format. The BGP Join/Leave VPN Extended Community field 1202 may be used for an IPv4 address with a route target 0x02 or route origin 0x03. The type high field 1204, type low field 1206, and flag 1212 are substantially the same fields as 1104, 1106, 1114, and 1116, respectively. DC ID prefix field 1208 in Join/Leave parameter value 1214 may be aligned with the four octet Global prefix that identifies the extended community source. The VPN ID field 1210 is similar to the VPN ID field 1112 except that the VPN ID field 1210 may be shortened by about one octet. The type high field 1204 may have data values of 0x40 or 0x02, while the type low field 1206 may have data values of 0x02 and 0x03. Another embodiment of the BGP Join/Leave VPN Extended Community field 1202 may be a four octet AS Community route target/origin. The type high field 1204 may have data values as 0x41 or 0x01, while the type low field 1206 may have a 0x02 for a route target or 0x03 for an origin target.

Figure 13:
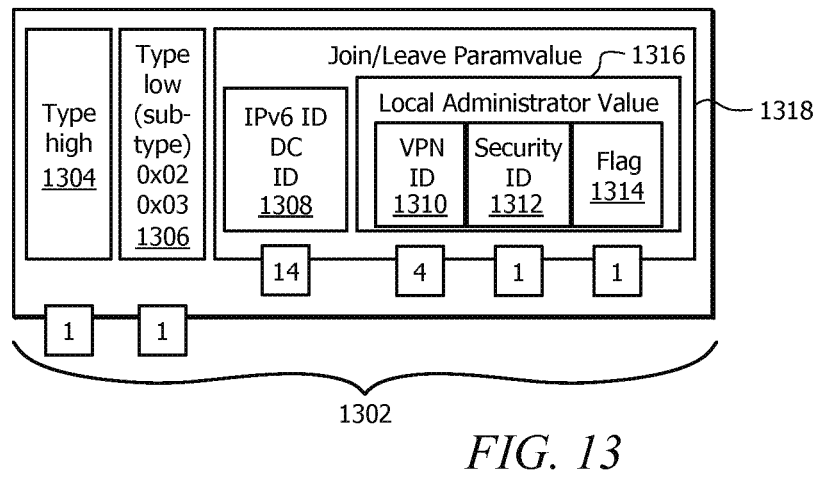
FIG. 13 is a schematic diagram of another example embodiment of a BGP Update message using the Extended Communities.

FIG. 13 is a schematic diagram of another example embodiment of a BGP Update message using the Extended Communities format. The BGP Join/Leave VPN Extended Community field 1302 may be an IPv6 identified address for the Extended Community. The type high field 1304, type low field 1306, Security ID 1312, and Join/Leave flag 1314 may be substantially the same as fields 1104, 1106, 1114, and 1116, respectively. Similar to FIG. 12, the type low field 1306 may be encoded with a 0x02 for a route target and 0x03 for a route origin. The Join/Leave Parameter value 1318 may comprise the IPv6 ID DC ID 1308 and the Local Administrator Value 1316. The IPv6 ID DC ID 1308 may be about 14 bits long for the network address in IPv6. The Local Administrator Value may comprise the VPN ID 1310, the Security ID 1312, and flag byte 1314. The VPN ID 1310 may be substantially the same as VPN ID 1210 except that VPN ID may be about 4 bytes long.

Returning to FIGS. 9A, 9B, and 10 as an example, BGP message exchange between BGP Peer 1 602 and BGP Peer 2 602 may send a Join VPN request from BGP peer 1 602 to BGP peer 2 602 using the BGP Extended Communities attribute. The Extended Community attribute 914 may be in an Opaque Community format as shown in FIG. 9B. The exchange between BGP peer 1 602 and BGP Peer 2 602 may deal with the DC ID equal to 0x0010, VPN ID equal to 0x0020, and Security ID equal to 0x30. The flag byte 930 may have a format of the flag field 1026 as shown in FIG. 10, except the type high field 1016 may have a data value of 0x43 or 0x03. The flag byte 930 may be sent by BGP Peer 1 602 and may set the BGP VPN Info flags for: All AFI/SAFI, Join, request, and accept, version 0, no BW support and no QOS support. This indicates BGP Peer 1 602 is requesting to join the identified VPN. As a response, the BGP Peer 2 602 may send the flag bytes All AFI/SAF, join, response, accept, version 0 format, no BW support and no QOS support. The in-banding signaling has been successful and the agreed upon automated configuration has been completed. Although FIG. 9A illustrates a sequential exchange of two BGP Update messages 902, those skilled in the art are aware that many BGP Update messages 902 can be transmitted from BGP Peer 1 602 to BGP Peer 2 602 between the shown two messages. The VPN identifiers (e.g. DC ID, VPN ID, and Security ID) and AFI/SAFI may track the appropriate information to set-up the VPN.

Subsequently to joining a VPN, a BGP message exchange between BGP Peer 1 602 and BGP Peer 2 602 may send a leave VPN request using the BGP Extended Communities attribute. To implement a leave request, the values of the join/leave VPN flag 1030 may be set to a data value zero to indicate that BGP Peer 1 602 is requesting to leave a VPN. BGP peer 2 602 may send a leave response for the All AFI/SAFI accepting the release of this VPN. Similar to the join request, many BPG Update messages 902 may pass back and forth between BGP Peer 1 602 and BGP Peer 2 602.

Figure 14:
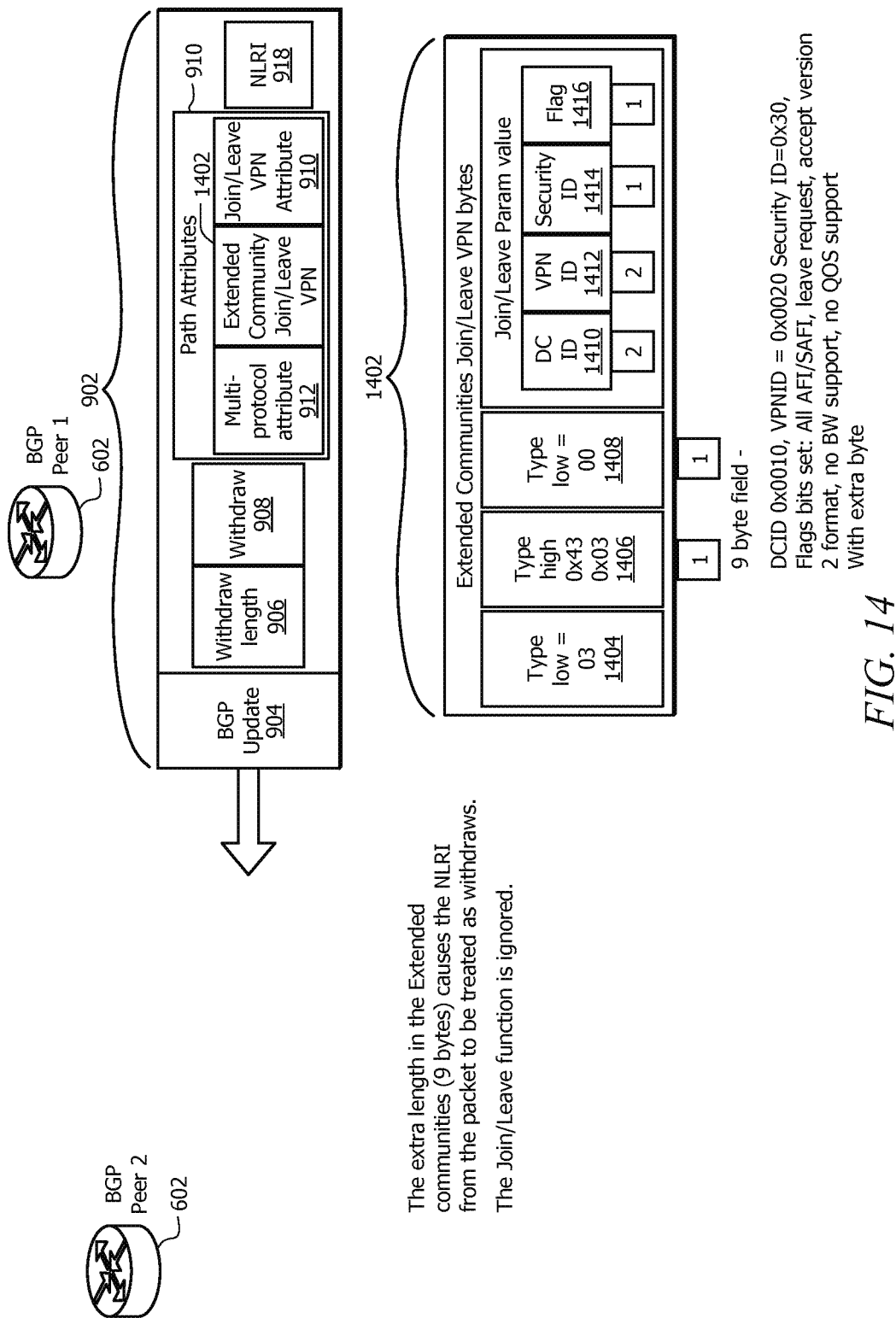
FIG. 14 is a schematic diagram of an example embodiment of "treat-as-withdraw" error processing.

FIG. 14 is a schematic diagram of an example embodiment of "treat-as-withdraw" error processing. The type high field 1406, type low field 1408, DC ID 1410, VPN ID 1412, Security ID 1414, and flag byte 1416 are substantially the same as fields 1016, 1018, 1020, 1022, 1024, and 1026 shown in FIG. 10. The "treat-as-withdraw" error processing may occur when an extra byte is inserted into the Extended Community Join/Leave VPN field 1402. FIG. 14 illustrates that an extra type low field 1404 has included in front of the normal Extended Community Join/Leave VPN field 1402. The BGP Peer 2 602 receives the BGP UDATE message 904 and treat the nine octet Extended Community Join/Leave VPN field 1402 as an error, and withdraws the NLRI announced per BGP error handling. The values within the Extended Community Join/Leave VPN field 1402 are ignored by BGP Peer 2 602 because of the extra type low field 1404. BGP Peer 1 602 may detect the loss by a time or other indication of errors.

Another processing error may comprise an unsupported version format within the flag byte 1416 and/or illegal values in the type fields 1408 when implementing the Extended Community Join/Leave VPN field 1402. A BGP Update message 902 may be sent between BGP Peer 1 602 and BGP Peer 2 602. For example, the BGP Peer 1 602 may send an BGP Update Message 902 with a type low field 1408 having an illegal value of 77 and an illegal version value "02" in the flag byte 1416. Either of these parse errors may cause the VPN join request to be rejected. BGP Peer 2 602 may send another BGP Update message 902 with the same illegal type field 1408 and the same flag field 1416 that was sent from BGP Peer 1 602.

Figure 15:
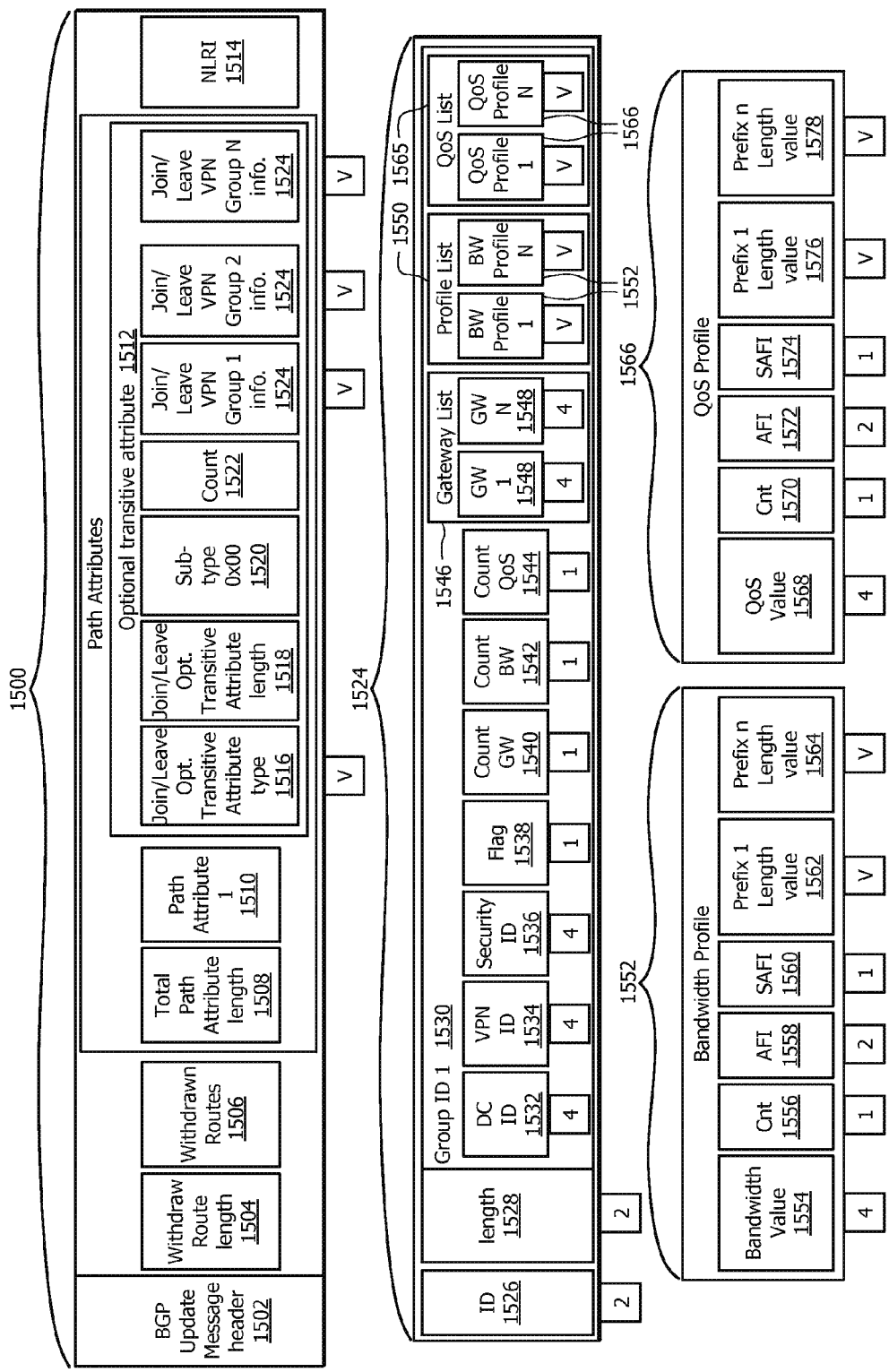
FIG. 15 is a schematic diagram of another example embodiment of a BGP Update message using Optional Transitive Attribute.

FIG. 15 is a schematic diagram of another example embodiment of a BGP Update message 1500 using Optional Transitive Attribute. BGP Update Message header 1502, withdraw route length field 1504, withdrawn routes field 1506, total path attribute length 1508, and path attribute 1 1510 may be substantially the same fields as 904, 906, 908, 1002, 1004 shown in FIG. 10. The optional transitive attribute 1512 may substantially be the same as Join/Leave Optional Transitive Attribute 916 shown in FIG. 9B. The NLRI 1514 may substantially be the same as NLRI 918. The Join/Leave Optional Transitive Attribute type 1516, Join/Leave Optional Transitive Attribute length 1518, sub-type field 1520, count 1522, Join/Leave VPN group field 1524, ID 1526, length 1528, DC ID 1532, VPN ID 1534, Security ID 1536, flag byte 1538, Gateway (GW) list 1546, profile list 1550, and QoS list 1554 may be substantially the same as FIG. 9B fields 934, 936, 938, 940, 942, 944, 946, 948, 950, 952, 954, 956, 958, and 960 respectively. The Count GW 1540, count BW 1542, and count QoS 1565 may indicate the number of gateways, BW profiles, and QoS profiles, respectively.

The GW List 1546 may comprise a plurality of GW profiles 1548. The BW profile list field 1550 may provide a list of BW profiles 1552. The BW profile 1552 has a bandwidth value field 1554 about four octets longs, a count of prefix associated with that bandwidth 1556 about one octet long, an AFI field 1558 about two octets long, a SAFI field 1560 about one octet long, and a series of prefix length values with varying lengths, which may be configured to use bandwidth value 1562 and 1564. The QoS list 1565 may comprise a plurality of QoS profiles 1566, where each QoS profile 1566 may comprise a QoS value 1568 about four octets long, a Count of QoS Prefix 1570 about one octet long, an AFI field 1572 about two octets long, a SAFI field 1574 about one octet long, and a series of prefix lengths with QoS values 1576 and 1578. The Count fields 1556 and 1570, AFI fields 1558 and 1572, SAFI 1560 and 1574, and prefix lengths 1562, 1564, 1576, and 1578 are understood by persons skilled in the art of BGP protocol.

Returning to FIG. 9A as an example BGP Update Messages 902 may be sent between BGP Peer 1 602 and BGP Peer 2 602 that comprises the Join/Leave optional attribute 1512 to do the Join/leave VPN. BGP peer 1 sends a BGP Update message in 902 with a format known by persons of ordinary skill in the art for the withdraw route length 1504, withdraw routes 1506, path attributes and NLRI 1514. One group field 1524 may be encoded such that the DC ID 1532 is 0x00002010, the VPN ID 1534 is 0x12341246, the Security ID 1536 is 0x30010203, and the flag bytes 1538 has bit set for are ALL AFI/SAFI, join, request, version 0 format, count of hint gateways 2, count of bandwidth 1, and count of QOS 1. The gateways hinted may be 192.15.1.1 and 1926.5.1.1. The first bandwidth profile 1552 may have a value of five with a count field 1556 of one prefix. The AFI/SAFI field 1558 and 1560 may identify a VPN IPv4/unicast with a prefix length value 1562 of 128.2/16. The QoS profile 1566 may have a QoS value 1568 of three, a count field 1570 of one. The AFI/SAFI field 1572 and 1574 may identify a VPN IPv4/unicast value with a prefix length value 1576 of 128.4/16. The Bandwidth profile in this field may allow this bandwidth profile to be automatically assigned to any network or host in the 128.2/16 prefix range for IPv4 unicast traffic. The QoS profile may allow the QoS value of three to be assigned to any network with AFI/SAFI of IPv4 unicast and the prefix range of 128.4/16.

After BGP Peer 602 receives the BGP Update message 902, BGP Peer 2 602 may send back a BGP Join/Leave path attribute using the same DC ID 1532, VPN ID 1534, Security ID 1536, BW profiles 1550, GW profiles 1546, and QoS profiles 1554. However, the flag word bytes 1538 may be set flags All AFI/SAFI join, response, accept, version zero format. The VPN has been joined at the BGP peer 2 602 and sends the BGP Update message 902 with the path attribute. Again, the BGP Update message 902 with these attributes can be separated by many BGP Update Message 902 or Keepalive messages. The length of delay a BGP Peer that may allow other BGP Update Message 902 or Keepalive messages to be sent back is a local configuration matter.

BGP Peer 1 602 may send a BGP Update message 902 to BGP Peer 2 602 using optional transitive update processing to request to leave the VPN. The BGP Update message 902 may have the VPN identified using the DC ID 1532 with data value 0x00002010, VPN ID 1534 with data value 0x12451256, and Security ID 1536 with data value of 0x30010203 as shown in 1254. The VPN Information passed in the BGP Update Message 902 may also include two hint gateways that are passed as 192.15.1.1 and 192.5.1.1 along with one bandwidth profile and one QoS profile. The BGP Peer 2 602 upon receipt of the BGP Update Message 902 may determine the BGP Update Message 902 is valid and has the VPN identified in the BGP Update Message 902. BGP Peer 2 602 may then send the BGP Update message 902 to acknowledgement that BGP peer 1 602 is leaving VPN identified by DC ID 0x00002010, VPN ID 0x12451256, and Security ID 0x30010203. The BGP Update message 902 sent by BGP Peer 2 may have the flag byte fields 1538 set to ALL AFI/SAI, leave response, accept version 0 format.

As shown above, in-band BGP signaling may be able to use the longer fields in the Join/Leave BGP VPN Path Attribute, and thus may perform in-band signaling using all of the resources for a VPN or a portion of the resources of the VPN. For ease of description, the above non-limiting examples that use optional transitive attributes have demonstrated the join and leaving of all of the resources associated with a VPN. Other embodiments for the Join/Leave BGP VPN Path Attribute may include addition/deletion of AFI/SAFI ranges, different jointly shared gateways, different bandwidth profiles, and different QoS profiles as controlled by the combination of policy at the cooperating BGP Peers.

BGP Peer 1 602 may send to BGP Peer 2 602 a BGP Update Message 902 with a Join/Leave Attribute 1512 with a version format (e.g. version 1) found in the flag byte 1538 that does not match the Join/Leave Information BGP Peer 2 602 accepts. BGP Peer 2 602 may send back a BGP Update Message 902 with a Join/Leave Attribute 1512 with the flags set in the flag byte 1538 as "leave, response, reject" including the version number field value of 1 and other fields as shown in 1268. By doing so, BGP Peer 2 602 may reject the join/leave request based on the different versions format of the Join/Leave BGP Attribute 1512.

Figure 16:
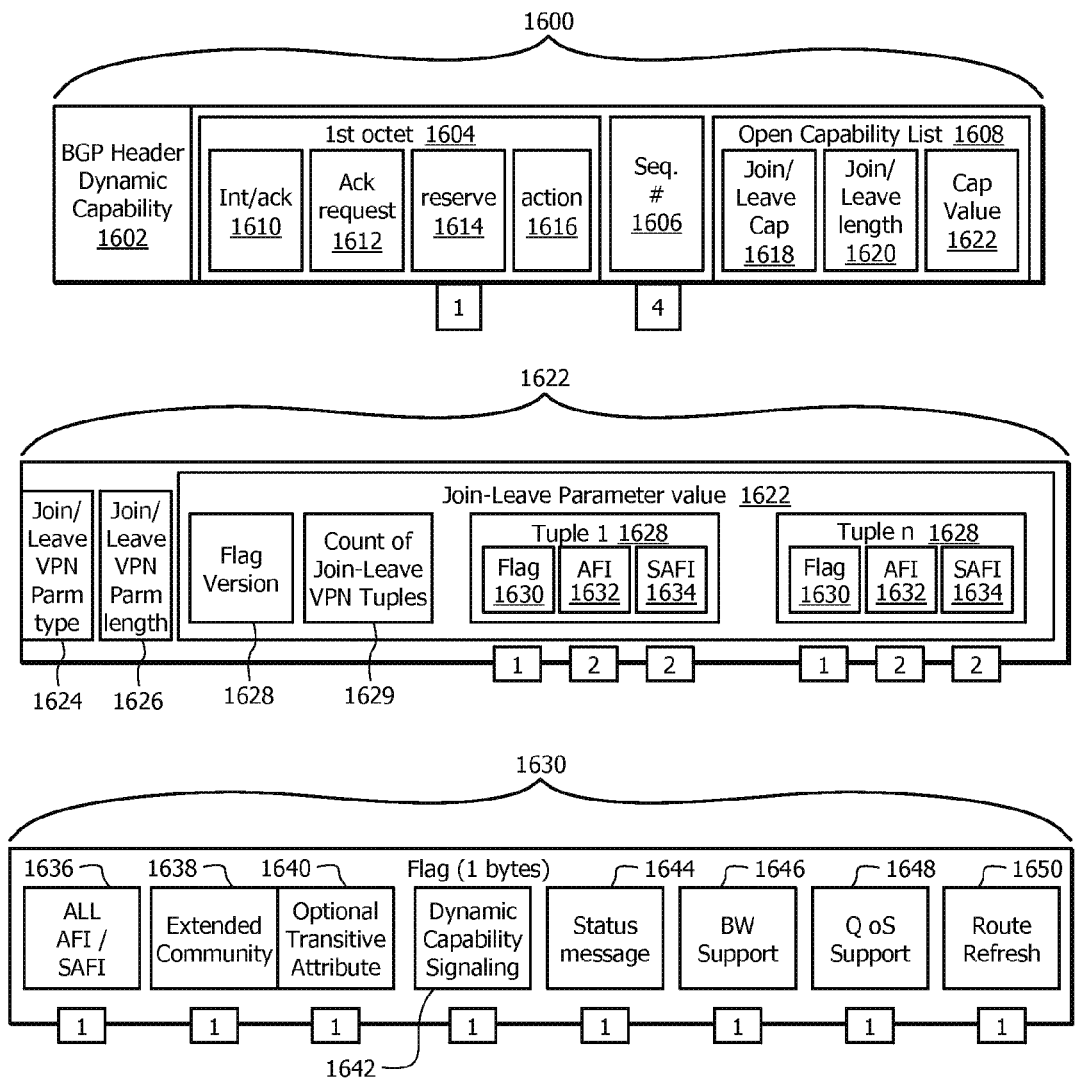
FIG. 16 is a schematic diagram of an example embodiment of a BGP Dynamic Capability with the join/leave VPN capability.

FIG. 16 is a schematic diagram of an example embodiment of a BGP Dynamic Capability 1600 with the join/leave VPN capability. One embodiment of the BGP Dynamic Capability 1600 may be encoded as a dynamic capability add/delete version 0 found in the flag version field 1628. The flag version field 1628 may affect the flag byte field 1630 within the tuples. The Dynamic Capability packet formats is an IETF standard and may include the BGP dynamic header 1602, the first octet 1604, the sequence number 1606, and the open capability list in 1608. Also standardized are the initialization (INIT)/acknowledge (ACK) field 1610, the acknowledge (ACK)/request field 1612, the reserve field in 1614, and the action field in 1616. This standard also includes the ability to have BGP Open Capabilities included in the open capability field 1608. Persons of ordinary skill in the art are aware of the field lengths and use of the fields within the standards. The Join/Leave Open Capability list 1608 may comprise a Join/Leave Cap type 1618, a Join/Leave length in 1620, and variable length capability value field 1622. The variable length capability value field 1622 may be used to encode version 0 of the capability using the specific flags for the Join/Leave Flag 1630 in the Tuple. The version 0 encoding of the Join/Leave VPN Dynamic capability in 1630 matches the Open Capability encoding shown in FIG. 5 field 536. The fields 1624, 1626, 1628, 1629, 1630, 1632, 1634, 1636, 1638, 1640, 1642, 1644, 1646, 1648, and 1650 may be substantially the same as 526, 528, 532, 534, 536, 538, 540, 544, 546, 548, 550, 552, 554, 556, and 558.

Figure 17:
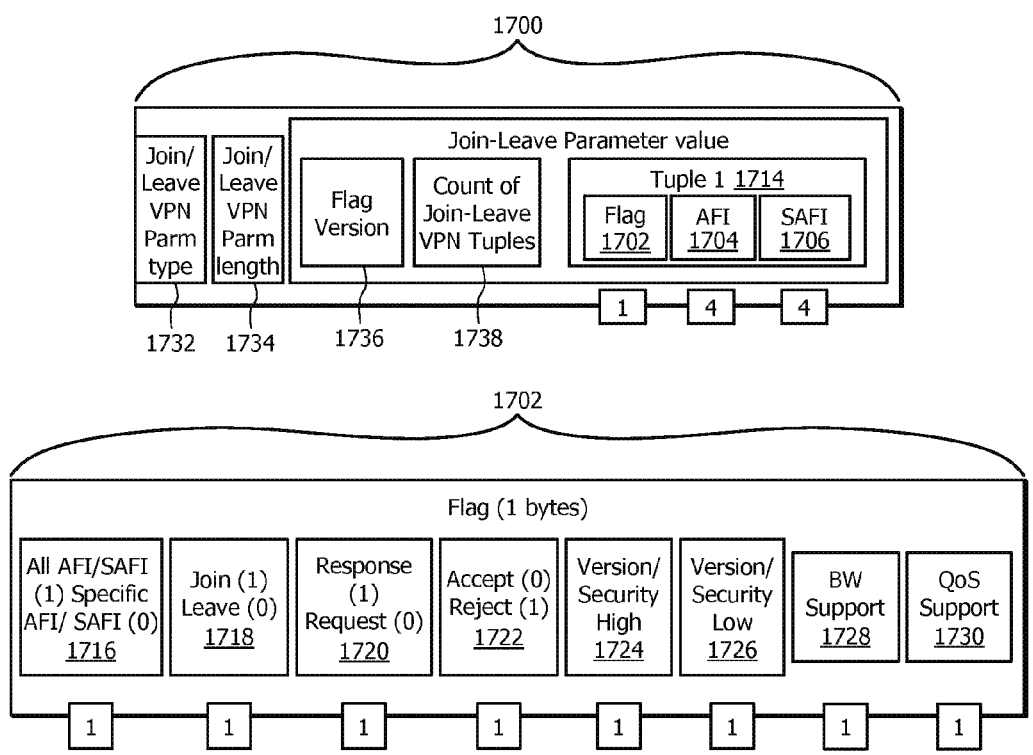
FIG. 17 is a schematic diagram of another example embodiment of a variable length capability value field.

FIG. 17 is a schematic diagram of another example embodiment of a variable length capability value field 1700. The variable length capability value field 1700 may be similar to the variable length capability value field 1622 except that the flag version field 1736 may be configured for version 1 instead of version 0, and thus requires a different flag byte field 1702. The flag byte field 1702 comprises the All AFI/SAFI field 1716, Join/Leave field 1718, the response/request field 1720, the accept/reject field 1722, the version/security high field 1724, the version/security low 1726, the BW support 1728, and the QoS support 1730. The Join/Leave VPN capability format version 1 may be used to pass the Join/Leave VPN information. Fields 1732, 1734, 1736, 1738, 1714, 1702, 1704, and 1706 may be the same as fields 1618, 1620, 1624, 1626, 1628, 1630, 1632, and 1634, respectively. The fields in 1716, 1718, 1720, 1722, 1724, 1726, 1728, and 1730 are the same as the fields 1028, 1030, 1032, 1034, 1036, 1038, 1040, and 1042, respectively. Persons of ordinary skill in the art are aware that Dynamic Capability may serves both to configure the Join/Leave Capability dynamic and to utilize the Join/leave Capabilities sequence number to determine sequences. Moreover, utilizing the dynamic Join/Leave capability configuration and the Join/Leave signaling within the dynamic capability may minimize the use of space. The Dynamic sequencing provides sequencing for these requests.

Figure 18:
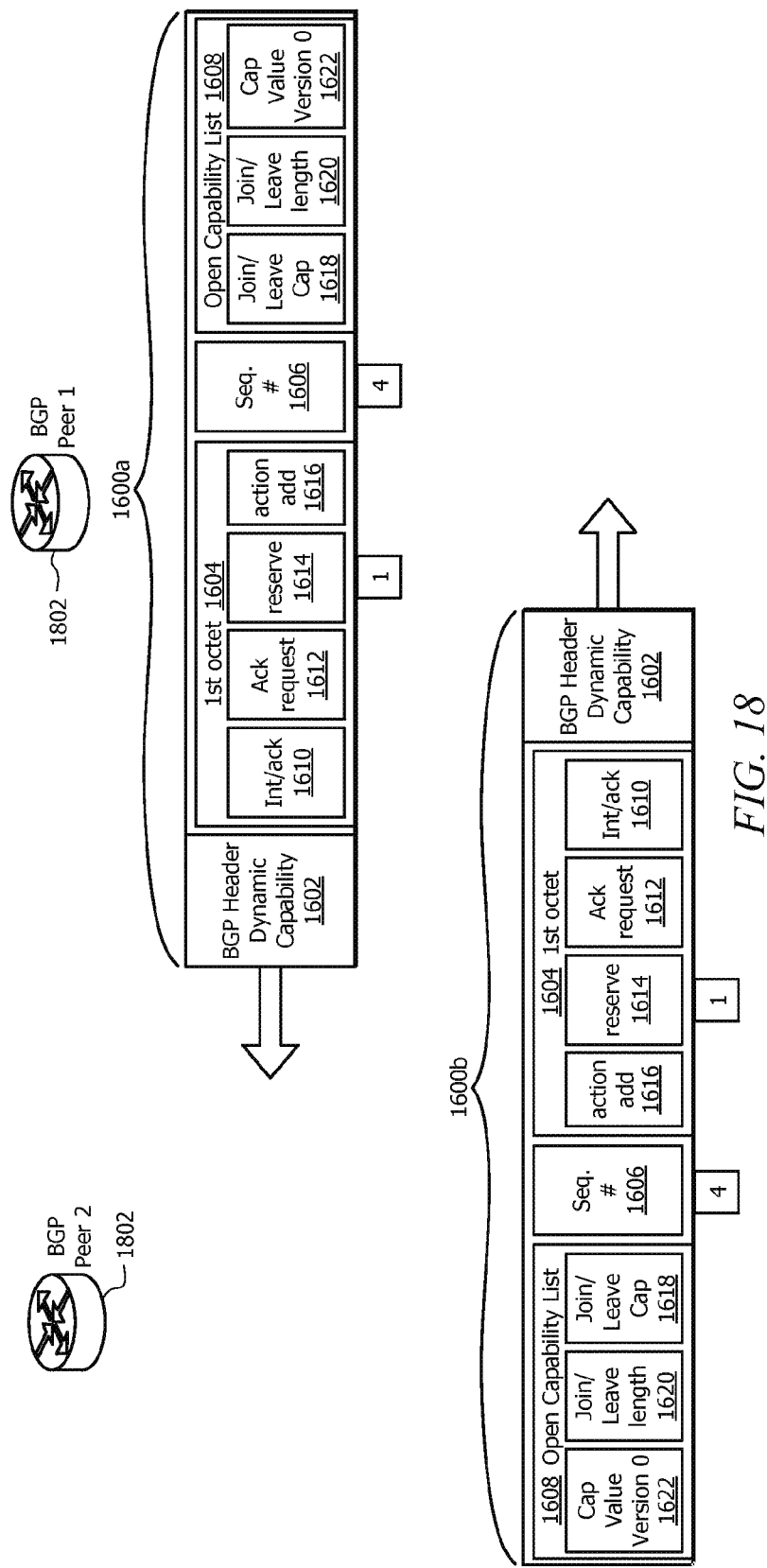
FIG. 18 is a schematic diagram of an example embodiment of BGP message exchange between two BGP peers using Dynamic Capability.

FIG. 18 is a schematic diagram of an example embodiment of BGP message exchange between two BGP peers 1802 using Dynamic Capability. BGP Peers 1802 are substantially the same components as BGP peers 602. The Dynamic Capabilities shown in FIG. 18 may use the version 0 encoding to configure Join/Leave VPN functionality and features. BGP peer 1 1802 may send a BGP Dynamic Capability message 1600a with BGP Message header 1602 followed by the first octet 1604, a sequence number field in 1606, and Open Capability list field 1608. The first octet field 1604 may comprise the action Add capability 1616 and ACK/request field 1612 that may require an acknowledgment when the flag is set. The Open Capability list field 1608 may comprise the Join/Leave Dynamic Capability type 1618, the Join/Leave Capability length field 1620, and the Capability value 1622 with the zero encoding (i.e. version zero). INT/ACK field 1610 and reserve field 1614 may be found in the first octet field 1604.

When BGP Peer 1 1802 sends the BGP Dynamic Capability message 1600a to BGP Peer 2 1802, BGP Peer 1 1802 indicates that it wants to exchange the Join/Leave VPN information within the Open Capability List 1608. The BGP Dynamic Capability message 1600 may include some or all of the capabilities negotiated in the BGP Open messages. Based on local policy, BGP Peer 2 1802 may positively acknowledge the BGP capabilities to be used to exchange the Join/Leave VPN features. In such case, the BGP Peer 2 1802 may send a second BGP Dynamic Capability message 1600b that echoes the same values within the Capability fields 1618, 1620 and 1622 using the version 0 encoding from the BGP Dynamic Capability message 1600a sent by BGP Peer 1. Encoding the Capability value 1622 in version zero may exchange Join/Leave VPN information that comprises Extended Communities attributes, Dynamic Capability attributes, Join/Leave Optional transitive attribute, Status message, Route refresh, BW profiles, and QoS profiles. BGP peer 2 1602 may determine that it will add the capability to Join/Leave VPN by passing information in extended communities, dynamic capability, optional transitive attributes, status message, and route refresh using the BW information and QoS information.

Persons of ordinary skill in the art are aware that extensions may use a feature to add/delete BGP capabilities using the action field 1616. When the action field 1616 is set to an "add" function, a merger of a later sequence number may be used to update BGP capabilities. The add feature may allow two BGP Peers to negotiate changes in the open capabilities sent in version 0. When the action field 1616 indicates a "remove" function, the Dynamic Capability may remove all capabilities linked to the sequence number within the latest update.

Another embodiment of BGP Dynamic Capability message 1600 used during the exchange between BGP peers may be in the version 1 format. BGP peer 1 1802 may signal the addition of a VPN via the BGP Dynamic Capability message 1600 with the BGP Dynamic Capability header in 1602, the first octet 1604, the sequence number in 1606, and the Open Capability list 1608. The Open capability list 1608 may include Join/Leave VPN information using Join/Leave Capability type 1618, a Join/Leave length in 1620, and a Join/Leave value 1622. For example, the Join/Leave VPN information may include the type of Join/Leave Capability, a length of about eight octets, a Flag version of one, count of one, a tuple with a flag word, an AFI of IPv4, and a SAFI of unicast. The Flag word may indicate values of AFI/SAFI=0, Request, accept, version 1, no BW profile support, no QoS support, AFI may equal IPv4, SAFI may equal unicast. The Dynamic Capability header may have an INIT value of zero, an ACK value of one, an add action of one, and sequence of 0x0011.

BGP Peer 2 1602 may respond with a BGP Dynamic Capability message 1600b similar to the receive BGP Dynamic Capability message 1600a from BGP Peer 1 1602. For example, the Dynamic Capability header 1602 may have an INITI value of one, an ACK value of one, an action add value of zero, and a sequence value of 0x0011. The Join/Leave VPN capability may have a header of type Join/Leave VPN capability, a length of about eight octets, a Flag version of one, count of one, a tuple with a flag word, an AFI of IPv4, and a SAFI of unicast. The Flag word may indicate values of AFI/SAFI may equal 0, join, response, accept, version 1, no BW profiles, and no QoS profile.

As shown above, the Dynamic Capability messages may add, delete, and update the BGP capabilities passing the Join/Leave VPN information using form version 0, and to signal join/leave VPN using the Join/Leave capability within the Dynamic Capability message using version 1. The dual use of the Dynamic capability provides a signaling mechanism with sequencing and update facilities.

Figure 19:
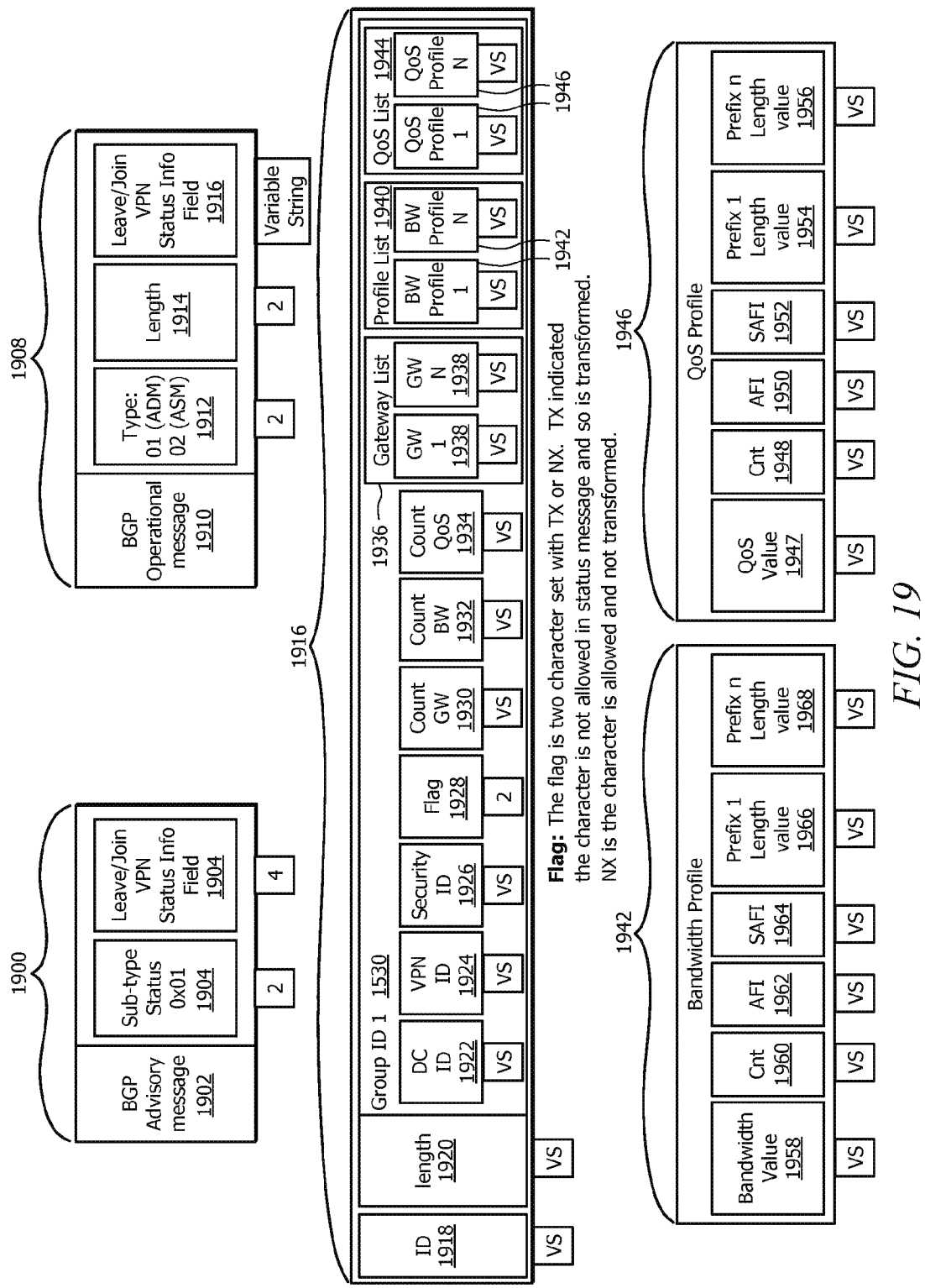
FIG. 19 is a schematic diagram of an example embodiment of status messages used to pass Join/Leave BGP information.

FIG. 19 is a schematic diagram of an example embodiment of status messages 1900 and 1908 used to pass Join/Leave BGP information. FIG. 19 illustrates the encoding of the Join/Leave VPN information in the BGP Advisory status message 1900 and in the BGP operational Status message 1908. Both status messages 1900 and 1908 may use American Standard Code for Information Interchange (ASCII) text delimited by spaces. The BGP Advisory in 1900 may comprise an Advisory BGP message header 1902, a sub-type field 1904 about two octet longs and set to 0x01 for status passing, and a status information field 1904 about four octets long for the Join/Leave VPN information. The status information field 1904 may comprise status information found in the status information field 1916 with the Bandwidth Profile list 1942, and the QoS Profile list 1944.

The BGP Operational messages 1908 may comprise an Operational BGP Message type 1910, a type field 1912 about two octets long, a length field 1914 about two octets long, and status information field 1916 that includes the Join/Leave VPN information. FIG. 19 illustrates the fields 1918, 1920, 1922, 1924, 1926, 1930, 1932, 1934, 1938, 1942, 1946, 1947, 1948, 1950, 1952, 1954, 1956 1958, 1960, 1962, 1964, 1966, and 1968 are indicated with "vs" lengths. The "vs" lengths indicate the fields may be encoded with the appropriate ASCII characters delimited by spaces. The flag field 1928 may be about two octets long where one of the octet bit values may be used similar to the flag field 1538 shown in FIG. 15. Depending on the status message encoding methodology, the additional octet may be a transmitted transformed (TX) or untransformed (NX). BGP Update message handing for the optional transitive attribute provides status message passing methodology and BGP Dynamic Capability transfer provides request/response methodology.

The status information field 1916 for the Join/Leave VPN information are substantially the same fields shown in FIG. 15 with field 1918, 1920, 1922, 1924, 1926, 1928, 1930, 1932, 1934, 1936, 1940, and 1944 being substantially the same format as the fields 1526, 1528, 1532, 1534, 1536, 1538, 1540, 1542, 1544, 1546, 1550, and 1554. Similarly, the expansion of a BW profile field 1942 may be substantially the same expansion as the BW profile 1552 in the Optional Transitive attribute shown in FIG. 15. Thus, fields within 1958, 1960, 1962, 1964, 1966, and 1968 are substantially the same as the fields in 1554, 1556, 1558, 1560, 1562, and 1564. The fields in the QoS Profile 1946 are substantially the same as the fields in the QOS profile 1562 for the BGP Join/Leave Optional Attribute. As a result, fields 1947, 1948, 1950, 1952, 1954, and 1956 are substantially the same as fields 1568, 1570, 1572, 1574, 1576, and 1578 from FIG. 15. Persons of ordinary skill in the art are aware that the ability to send the same expanded form of Join/Leave VPN information sent in the BGP Join/Leave VPN attribute is important to allow bridging of portions of networks, which support a mixture of the BGP Optional Transitive attribute and the status message.

Figure 20:
FIG. 20 is a schematic diagram of an example embodiment of encoding of the Join/Leave VPN information into the outbound route filtering (ORF) fields of the BGP Route Refresh Message.

BGP Route Refresh Message 2010 may be encoded using a Join/Leave ORF 2020 of sub-type 0. The sub-type encoding may create ORF type value 2035 that are equivalent to the Join/Leave VPN Optional transitive group 1524. FIG. 20 shows the Route Refresh message with the header 2011, the length in 2012, the Route Refresh fields (AFI field 2014, Reserved field 2015, and SAFI field 2016), and the ORF fields 2020 for Join/Leave ORF. The Join/Leave ORF fields 2020 comprises a when to refresh in 2022, the type field 2024, the length of the ORF entries 2026 that is about two octets long, the sequence number in 2031, and the ORF entries 2030. Each ORF entry 2033 may each comprise the ORF Action-Match-Type (AMT) 2034 about one octet long, and the ORF type values 2035. The ORF type values 2035 comprise an ID 2051 for the Join/Leave information, a length field 2052, a Group ID 2046, a Gateway list 2040, a profile list 2042, and a QoS list 2044, which may be substantially the same as fields 1526, 1528, 1530, 1546, 1550, and 1565 from FIG. 15. The Join/Leave BW profile 2070 may be substantially the same as the BW profile 1552 in FIG. 15. Fields 2082, 2083, 28084, 2085, 2086, and 2088 within the Join/Leave BW profile 2070 may be substantially the same as 1554, 1556, 1558, 1560, 1562, and 1564. The Join/Leave QoS Profile 2072 may be substantially the same as the QoS profile 1566. Fields 2091, 2092, 2093, 2094, 2095, and 2096 within the Join/Leave QoS Profile 2072 may be substantially the same as 1568, 1570, 1572, 1574, 1576, and 1578.

Figure 21:
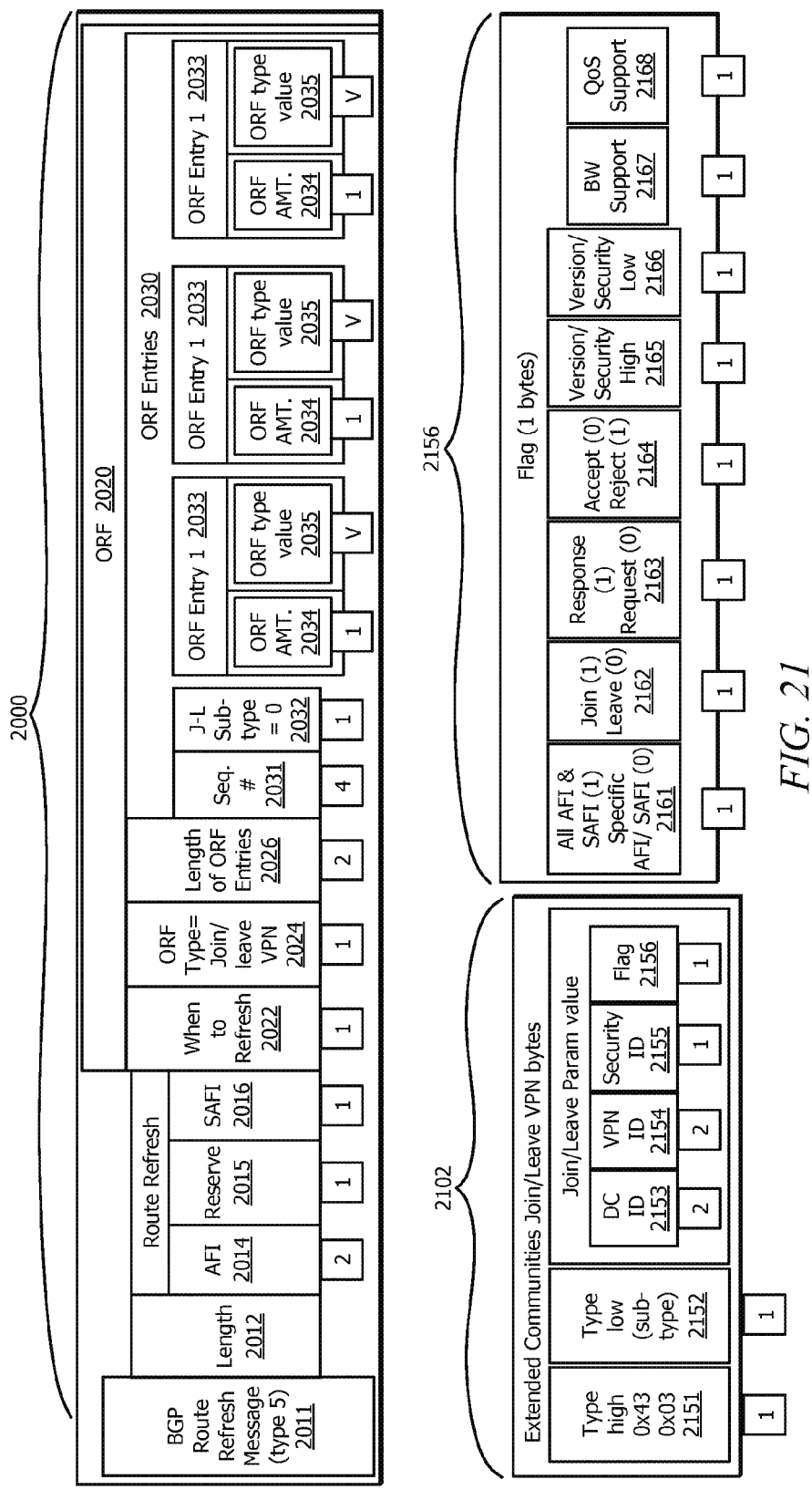
FIG. 21 is a schematic diagram of another example embodiment of encoding of the Join/Leave VPN information into the outbound route filtering (ORF) fields of the BGP Route Refresh Message.

FIG. 21 is a schematic diagram of another example embodiment of encoding of the Join/Leave VPN information into the ORF fields of the BGP Route Refresh Message 2000. BGP Route Refresh Message 2000 may use a version 1 encoding. The sequence field 2032 may be set is set to 1 for the BGP Route Refresh Message 2000, while the sub-type 2031 for the BGP Route Refresh Message 2010 may be set to 0 as shown in FIG. 20. The BGP Route Refresh Message may encode the ORF type values 2035 using the Extended Communities Join/Leave Information 2102. The Extended Communities Join/Leave Information 2102 is substantially the same as the Extended Community Join/Leave VPN field 1014. The flag byte field 2156 may be substantially the same as the flag byte field 1026 from FIG. 10.

BGP Route Refresh Message 2000 may comprise BGP Route Refresh Message type 2011, length field 2012, AFI field 2014, Reserve field 2015, SAFI 2016, When to Refresh field 2022, ORF Type Join/leave VPN 2024, Length of ORF Entries field 2031, and ORF Entries field 2030. The ORF Entries field 2030 may comprise Sequence number field 2031, J-L sub-type field 2032, and a plurality of ORF Entries 2033. Each ORF entry 2033 may each comprise the ORF Action-Match-Type (AMT) 2034 about one octet long, and the ORF type values 2035. The ORF type values may be encoded using the Extended Communities Join/Leave field 2102. Fields 2151, 2152, 2153, 2154, 2155, 2156, 2161, 2162, 2163, 2164, 2165, 2166, 2167, 2168 may be substantially the same as fields 1016, 1018, 1020, 1022, 1024, 1026, 1028, 1030, 1032, 1034, 1036, 1038, 1040, and 1042 found in FIG. 10.

FIGS. 20 and 21 illustrate different embodiments of the BGP Route Refresh Message. The BGP Route Refresh message may transfer encodings of the Join/Leave information across a heterogeneous set of BGP peers with different levels of support for the Join/Leave VPN informational passing. For example, BGP peers may be configured such that only some of the BGP peers may only support passing Join/Leave VPN informational passing using Extended Communities, BGP Join/Leave attribute support, BGP Join/Leave Information passing via Dynamic Capabilities, BGP Join/Leave VPN information passing via an Advisory status message, or BGP Join/Leave VPN information passing via Route Refresh services. By providing multiple embodiments for the different capabilities, Join/Leave information may be passed to all BGP peers that support Join/Leave VPN automatic in-band signaling.

The Route Refresh process may send some types of ORF policy for filtering. The Join/Leave ORF process may send VPN information to provide some automatic configuration of policy that may include filtering. The Route Refresh ORF process may allow adding, removing, and remove-all functions. The Route Refresh Add function may be used to carry the join feature of the Join/Leave VPN and the Remove function may be used to carry the Leave Feature of the Join/Leave VPN. The signaling with the Join/Leave VPN flag byte field 2060 in FIG. 20 and the flag byte field 2156 may signal the join/leave functionality.

Figure 22:
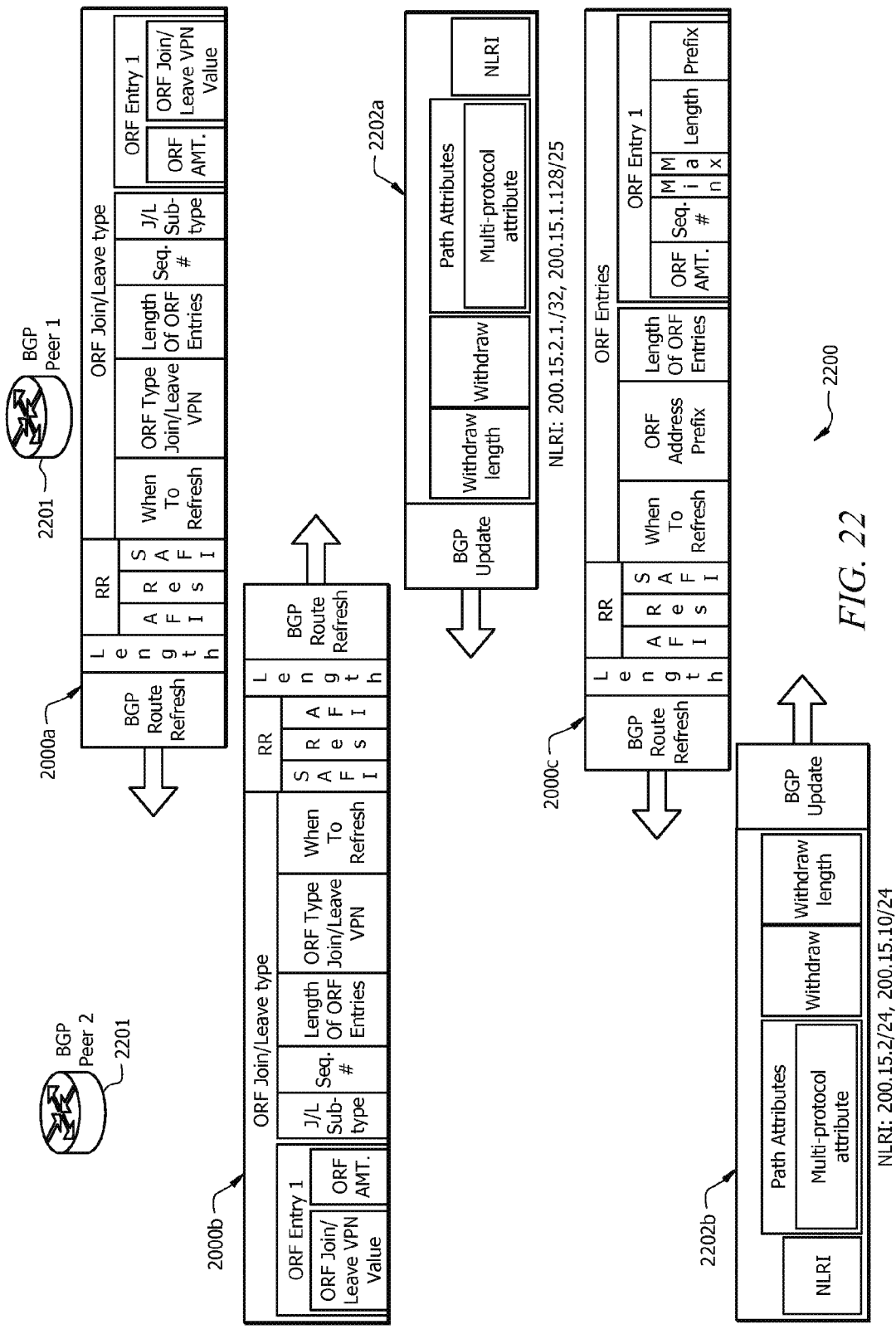
FIG. 22 is a schematic diagram of an example embodiment of BGP message exchange using Route Refresh and ORF filter interactions to join a VPN.

FIG. 22 is a schematic diagram of an example embodiment of BGP message exchange 2200 using Route Refresh and ORF filter interactions to join a VPN. BGP peer 2201 may be substantially the same as BGP peer 602. BGP Peer 1 2201 may exchange BGP Route Refresh message 2000 (e.g. request) with BGP Peer 2 2201 during a Route Refresh passage of Join/Leave VPN information. BGP route refresh message 2000 may include information to join the VPN identified of Data Center ID: 0x01020304, VPN ID: 0x00001000, and Security 0x0001002, which herein will be denoted as VPN Blue-boy in the Route Refresh process. BGP Peer 1 2201 may operate as a CE coupled to the vDC and may send Join/Leave VPN information in-band via the BGP the Route Refresh message 2000a to BGP Peer 2 2201, which may operate as a PE to signal to the BGP Peer 1's request to join VPN Blue Boy. BGP Peer 2 2001 may be configured to accept network and hosts routes from IPv4/Unicast prefix 200.15/16 for bandwidth profile one and QoS profile three for VPN Blueboy. BGP peer 2 2201 may then accept BGP Peer 1 2201 request to join VPN Blue Boy and send back a Route Refresh Message 2000b to accept the request to join VPN Blue Boy and ask for immediate sending of routes.

BGP Peer 1 2201 may then process the Route Refresh message 2000*b* and subsequently send routes 200.15.21.1/32 and 200.15.1.128/25 in the BGP Update message 2202*a* to be distributed in VPN Blue Boy. BGP Peer 1 2201 may complete its automatic configuration of VPN Blue Boy and may determine that the local policy for VPN Blue Boy requests a Deny filter for prefix 200.15.1/2 be sent to BGP Peer 2 using the BGP Update message 2202. Additionally, the BGP Peer 1 2201 may send a Deny filter via the Route Refresh Address Prefix ORF using the third BGP Route Refresh message 2000*c* for BGP Peer 2 as a Route Refresh request. The third BGP Route Refresh message 2000*c* may filter 200.15.1/24. Upon receiving the Route Refresh, BGP Peer 2 2201 may send the BGP Update message 2202*b* filtering 200.15.1/24 unless there is already a Deny filter for 200.15.1/24. Route Refresh cycles may stop route flows via in-band signaling until automatic configuration of the Joined VPN Blue Boy has been accomplished. The denial of the route 200.15.1/25 insures that the PE will not send the CE this route.

The FIG. 22 process may add three routes, 200.15.2.1/32, 200.15.128/25, and 200.15/16 when joining the VPN. A prefix, such as prefix 200.15/16 may be passed with Join/Leave VPN information associated with a bandwidth profile and QoS profile. The prefix signaled may be used by BGP Peer 1 2201 and BGP Peer 2 2201 as VPN Blue Boy main network prefix.

Figure 23:
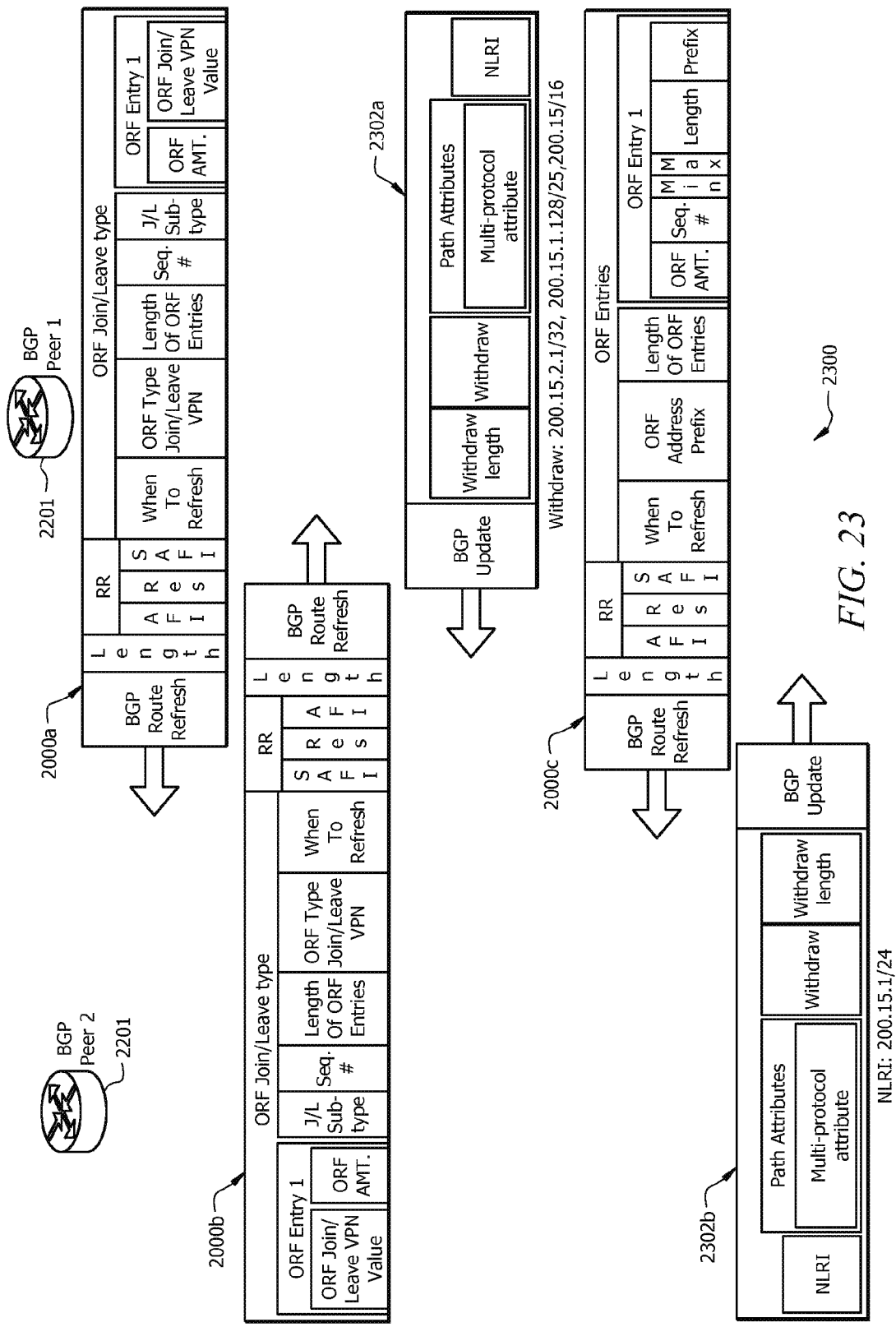
FIG. 23 is a schematic diagram of another example embodiment of BGP message exchange using Route Refresh and ORF filter interactions to leave a VPN.

FIG. 23 is a schematic diagram of another example embodiment of BGP message exchange 2300 using Route Refresh and ORF filter interactions to leave a VPN. BGP peer 1 2201 may send a Route Refresh message 2000*a* to BGP Peer 2 2201 with sequence 20 with a Join/Leave VPN ORF with a request to leave VPN Blue Boy. BGP Peer 2 2201 may receive the Route Refresh message 2000*a* for VPN Blue Boy and may send back a Route Refresh message 2000*b* to BGP Peer 1 2201 with a Join/Leave VPN ORF and request immediate sending of routes required by Route Refresh. BGP Peer 1 2201 responds by sending a BGP Update message in 2302 with a withdraw for routes 200.15.2.1/32 and 200.15.1.28/25 and 200.15/16 for IPv4/UNI SAFI. BGP Peer 1 2201 may continue processing and determines VPN Blue Boy policy may need a Deny filter for 200.15.1/24 to BGP Peer 2 2201. To remove this filter, BGP Peer 1 2201 may send a second another Route Refresh message 2000*c* to BGP Peer 2 2201 that encodes a sequence of 21 and contains Address Prefix ORF to remove the filter. BGP Peer 1 2201 may set the Immediate flag in the Route Refresh message 2000*c* so that BGP peer 2 2201 may send any routes that the ORF filter has blocked. BGP Peer 2 2201 may upon finding such routes filter, send a BGP update 2302*b* with NLRI 200.15.1/24. Persons of ordinary skill in the art are aware of the flags necessary to filter and implement the route refresh process discussed for FIGS. 22 and 23.

In FIG. 23, after BGP Peer 1 2201 has dropped VPN Blue-Boy, BGP Peer 1 2201 may send a withdraw for 20015.2.1/32, 200.15.128/25 and 200.15/16. The prefix may be encoded for the VPN with the BW profile and QoS profile to combine all needed portions of a Join/Leave VPN within the Join/Leave information.

The Route Refresh Join/Leave VPN ORF may echo the sequence number in the Join/leave ORF VPN that responds the request. For example, in FIG. 22, the Route Refresh join request sent by BGP Peer 1 2201 may send the Join/Leave ORF with a sequence number with a value of 0x0010. BGP Peer 2 2201 may send the Join/Leave ORF with the sequence number with a value of 0x0010. This provides assurance that the join-request-accept matches the join-response-accept. FIG. 23 also may echo the sequence numbers for the Route Refresh leave request. The Route Refresh may have the Join/Leave VPN ORF sent by BGP peer 1 2201 encoded with a sequence number 0x0020 and Join/Leave Flag of leave, request, accept. BGP peer 2 2201 may send back the Route Refresh with the Join/Leave VPN ORF with the sequence number of 0x0020 and Join/Leave flags of leave, response, accept.

Figure 24:
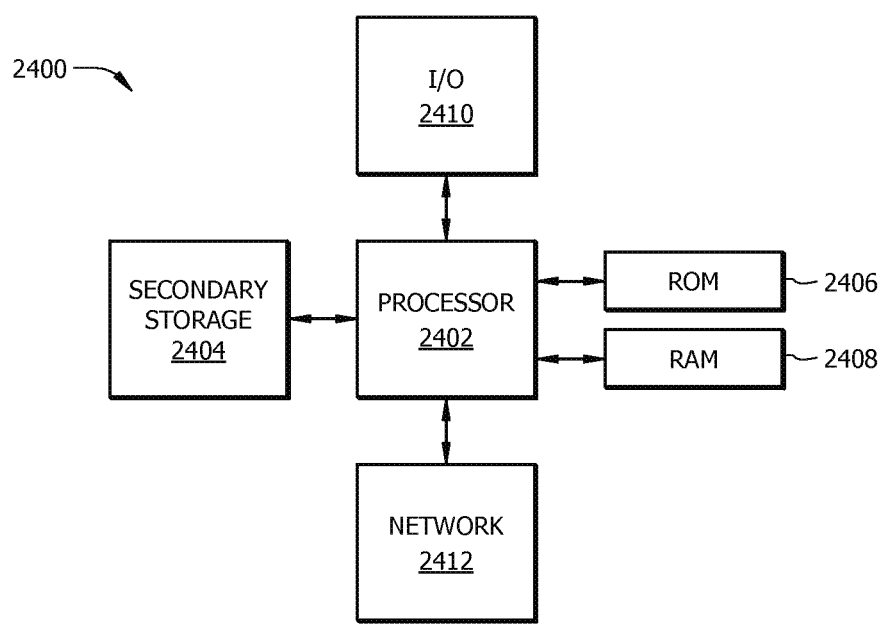
FIG. 24 is a schematic diagram of one embodiment of a general-purpose computer system suitable for implementing the several embodiments of the disclosure.

FIG. 24 illustrates a typical, general-purpose network component 2400 that may correspond to or may be part of any network component described herein, such as a server, a switch, a router, or any other network nodes. The network component 2400 includes a processor 2402 (which may be referred to as a central processor unit or CPU) that is in communication with memory devices including secondary storage 2404, read only memory (ROM) 2406, random access memory (RAM) 2408, input/output (I/O) devices 2410, such as a transmitter and a receiver, and network connectivity devices 2412. The general-purpose network component 2400 may also comprise, at the processor 2402 and or any of the other components of the general-purpose network component 2400.

The processor 2402 may be implemented as one or more CPU chips, or may be part of one or more application specific integrated circuits (ASICs) and/or digital signal processors (DSPs). The processor 2402 may comprise a central processor unit or CPU. The processor may be implemented as one or more CPU chips. The secondary storage 2404 is typically comprised of one or more disk drives or tape drives and is used for non-volatile storage of data and as an over-flow data storage device if RAM 2408 is not large enough to hold all working data. Secondary storage 2404 may be used to store programs that are loaded into RAM 2408 when such programs are selected for execution. The ROM 2406 is used to store instructions and perhaps data that are read during program execution. ROM 2406 is a non-volatile memory device that typically has a small memory capacity relative to the larger memory capacity of secondary storage 2404. The RAM 2408 is used to store volatile data and perhaps to store instructions. Access to both ROM 2406 and RAM 2408 is typically faster than to secondary storage 2404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

We claim:

1. A method for performing an automatic join and leave function for a host using Border Gateway Protocol (BGP) signaling, the method comprising:
    sending a BGP join request that indicates a request for the host to join a virtual network;
    receiving a BGP join response that indicates either an acceptance or a rejection of the BGP join request;
    adding the host to the virtual network when the BGP join response accepts the BGP join request;
    sending a BGP leave request that indicates a request to leave the virtual network;
    receiving a BGP leave response that indicates either an acceptance or a rejection of the BGP leave request; and
    removing the host from the virtual network when the BGP leave response accepts the BGP leave request,
    wherein the BGP join request comprises:
        a virtual network identifier (ID) field that identifies the virtual network that the host is attempting to join; and
        a version field that indicates the version of encoding used to encode the BGP join request, and
    wherein the BGP join request, the BGP join response, the BGP leave request, and the BGP leave response are BGP Update messages.

2. The method of claim 1 further comprising sending a BGP Open message request comprising a first join/leave capability field that indicates that a BGP speaker supports at least one of a plurality of mechanisms for the host to join the virtual network, wherein the BGP Open message request indicates a request to create a BGP session.

3. The method of claim 1, wherein the BGP join request further comprises a quality of service (QoS) requirement and a bandwidth requirement, and wherein the BGP join request, the BGP join response, the BGP leave request, and the BGP leave response are transmitted via an in-band mechanism for a routing information base (RIB).

4. The method of claim 1 further comprising validating the BGP join request prior to sending a BGP traffic frame, wherein the BGP join request further comprises a network layer reachability information field that indicates addresses within the virtual network and a join/leave field that indicates the BGP join request is a request message and not a response message.

5. The method of claim 1, wherein the BGP join request further comprises a quality of service (QoS) requirement and a bandwidth requirement.

6. A method for performing an automatic join and leave function for a host using Border Gateway Protocol (BGP) signaling, the method comprising:
    sending a BGP join request that indicates a request to join a virtual network;
    receiving a BGP join response that indicates either an acceptance or a rejection of the BGP join request;
    adding the host to the virtual network when the BGP join response accepts the BGP join request;
    sending a BGP leave request that indicates a request to leave the virtual network;
    receiving a BGP leave response that indicates either an acceptance or a rejection of the BGP leave request;
    removing the host from the virtual network when the BGP leave response accepts the BGP leave request;
    sending a BGP Open message request comprising a first join/leave capability field that indicates at least one of a plurality of mechanisms for either the host or the network to join the virtual network; and
    receiving a BGP Open message response comprising a second join/leave capability field that indicates at least one of the mechanisms to join the virtual network,
    wherein the BGP Open message request indicates a request to create a BGP session,
    wherein the BGP join request comprises a quality of service (QoS) requirement and a bandwidth requirement, and
    wherein the BGP session is created when the first join/leave capability field and the second join/leave capability field indicate the same mechanisms.

7. A method for performing an automatic join and leave function for a host using Border Gateway Protocol (BGP) signaling, the method comprising:
    sending a BGP join request that indicates a request to join a virtual network;
    receiving a BGP join response that indicates either an acceptance or a rejection of the BGP join request;
    adding the host to the virtual network when the BGP join response accepts the BGP join request;
    sending a BGP leave request that indicates a request to leave the virtual network;
    receiving a BGP leave response that indicates either an acceptance or a rejection of the BGP leave request; and
    removing the host from the virtual network when the BGP leave response accepts the BGP leave request,
    wherein the BGP join request comprises a quality of service (QoS) requirement and a bandwidth requirement, wherein the BGP join request comprises a first join/leave extended community field used to indicate a request to join the virtual network using a BGP Extended Communities mechanism, and wherein the BGP join response comprises a second join/leave extended community field used to indicate either the acceptance or the rejection of the BGP join request.

8. The method of claim 7, wherein the BGP leave request comprises a third join/leave extended community field used to indicate a request to leave the virtual network, and wherein the BGP leave response comprises a fourth join/leave extended community field used to indicate either the acceptance or the rejection of the BGP leave request.

9. A method for performing an automatic join and leave function for a host using Border Gateway Protocol (BGP) signaling, the method comprising:

sending a BGP join request that indicates a request to join a virtual network;

receiving a BGP join response that indicates either an acceptance or a rejection of the BGP join request;

adding the host to the virtual network when the BGP join response accepts the BGP join request;

sending a BGP leave request that indicates a request to leave the virtual network;

receiving a BGP leave response that indicates either an acceptance or a rejection of the BGP leave request; and removing the host from the virtual network when the BGP leave response accepts the BGP leave request, wherein the BGP join request comprises a quality of service (QoS) requirement and a bandwidth requirement, wherein the BGP join request comprises a join/leave extended community field used to indicate a request to join the virtual network using a BGP Extended Communities mechanism, and wherein the method further comprises ignoring the BGP join request when the join/leave extended community field is nine bytes long.

10. A method for performing an automatic join and leave function for a host using Border Gateway Protocol (BGP) signaling, the method comprising:

sending a BGP join request that indicates a request to join a virtual network;

receiving a BGP join response that indicates either an acceptance or a rejection of the BGP join request;

adding the host to the virtual network when the BGP join response accepts the BGP join request;

sending a BGP leave request that indicates a request to leave the virtual network;

receiving a BGP leave response that indicates either an acceptance or a rejection of the BGP leave request; and removing the host from the virtual network when the BGP leave response accepts the BGP leave request, wherein the BGP join request comprises a quality of service (QoS) requirement and a bandwidth requirement, wherein the BGP join request comprises a join/leave extended community field used to indicate a request to join the virtual network using a BGP Extended Communities mechanism, and wherein the BGP join response rejects the BGP join request when an error exists within the join/leave extended community field.

11. A method for performing an automatic join and leave function for a host using Border Gateway Protocol (BGP) signaling, the method comprising:

sending a BGP join request that indicates a request to join a virtual network;

receiving a BGP join response that indicates either an acceptance or a rejection of the BGP join request;

adding the host to the virtual network when the BGP join response accepts the BGP join request;

sending a BGP leave request that indicates a request to leave the virtual network;

receiving a BGP leave response that indicates either an acceptance or a rejection of the BGP leave request; and removing the host from the virtual network when the BGP leave response accepts the BGP leave request, wherein the BGP join request comprises a quality of service (QoS) requirement and a bandwidth requirement, wherein the BGP join request comprises a first optional transitive attribute field used to indicate a request to join the virtual network using a BGP optional transitive mechanism, and wherein the BGP leave request comprises a second optional transitive attribute field used to indicate a request to leave the virtual network using a BGP optional transitive mechanism.

12. The method of claim 11, wherein the first optional transitive attribute field comprises a version field that indicates a version format of the BGP join request, and wherein the BGP join response indicates the rejection of the BGP join request when the version format is not supported by a node receiving the BGP join request.

13. A method for performing an automatic join and leave function for a host using Border Gateway Protocol (BGP) signaling, the method comprising:

sending a BGP join request that indicates a request to join a virtual network;

receiving a BGP join response that indicates either an acceptance or a rejection of the BGP join request;

adding the host to the virtual network when the BGP join response accepts the BGP join request;

sending a BGP leave request that indicates a request to leave the virtual network;

receiving a BGP leave response that indicates either an acceptance or a rejection of the BGP leave request; and removing the host from the virtual network when the BGP leave response accepts the BGP leave request, wherein the BGP join request comprises a quality of service (QoS) requirement and a bandwidth requirement, wherein the BGP join request comprises a first dynamic capability field used to indicate a request to join the virtual network using a BGP Dynamic Capability mechanism, and wherein the BGP leave request comprises a second dynamic capability field used to indicate a request to leave the virtual network using a BGP Dynamic Capability mechanism.

14. The method of claim 13, wherein the first dynamic capability field comprises a data center identifier field that identifies a data center, a virtual private network (VPN) identifier field that identifies a virtual private network, and a security identifier field that identifies a security protocol.

15. An apparatus that requests to provision a host to a virtual network using Border Gateway Protocol (BGP) signaling, wherein the apparatus comprises:

a processor coupled to a transmitter and receiver, wherein the processor is configured to:

support a first set of BGP capabilities, wherein the first set of BGP capabilities comprises at least one BGP capability;

receive a first Open message comprising a second set of BGP capabilities, wherein the second set of BGP capabilities comprises at least one BGP capability;

determine to either accept or reject the first Open message, wherein the first Open message is accepted when the first set of BGP capabilities and the second set of BGP capabilities are the same;

transmit a second Open message comprising the first set of BGP capabilities, wherein the second Open message indicates either acceptance or rejection of the first Open message;

transmit a first BGP Route Refresh request after accepting the first Open message, wherein the BGP Route Refresh request comprises an outbound route filtering field associated with the virtual network and at least one route; and receive a BGP route update message after transmitting the BGP Route Refresh request, wherein the BGP route update message comprises the at least one route to transport a data frame, wherein the first BGP Route Refresh request comprises a version field that indicates a type of encoding and an add function field, and wherein the first set of BGP capabilities are updated to include a new BGP capability using the add function field.

16. The apparatus of claim 15, wherein the processor is further configured to transmit a BGP Update message that comprises a route used to transport the data frame.

17. The apparatus of claim 16, wherein the processor is further configured to transmit a second BGP Route Refresh request to remove a filter over the route, wherein the filter prevents the data frame from traveling over the route.

18. The apparatus of claim 16, wherein the version field indicates a Join/Leave Optional transitive group used to join the host to the virtual network.

19. The apparatus of claim 16, wherein the first BGP Route Refresh request comprises a first sequence number, wherein and wherein the BGP route update message comprises a second sequence number, and wherein the first sequence number and the second sequence number are the same.

20. An apparatus that determines whether to provision a network to a virtual network using Border Gateway Protocol (BGP) signaling, wherein the apparatus comprises:

a processor coupled to a transmitter and receiver, wherein the processor is configured to:

support a first set of BGP capabilities, wherein the first set of BGP capabilities comprises at least one BGP capability;

transmit a first Open message comprising the first set of BGP capabilities;

receive a second Open message comprising a second set of BGP capabilities, wherein the second set of BGP capabilities comprises at least one BGP capability;

receive a first BGP Update message that requests for the network to be joined to the virtual network, wherein the first BGP Update message comprises a plurality of Address Family Identifier (AFI) routes and a virtual network identifier (ID) field that identifies the virtual network that the network is attempting to join;

determine to either accept or reject the first BGP Update message, wherein the first BGP Update message is rejected when AFI routes are rejected; and transmit a second BGP Update message, wherein the second BGP Update message indicates either acceptance or rejection of the first BGP Update message, wherein the network does not join the virtual network when the first BGP Update message is rejected, and wherein the network joins the virtual network when the first BGP Update message is accepted.

21. The apparatus of claim 20, wherein the first BGP Update message comprises a network layer reachability information (NLRI) field, and wherein a bandwidth requirement is associated with the network when joining the virtual network.

22. The apparatus of claim 20, wherein a quality of service (QoS) requirement is associated with the network when joining the virtual network, and wherein one of the BGP services indicated in the first set of BGP capabilities is used to communicate joining information after establishing the BGP session.

23. An apparatus that determines whether to provision a network to a virtual network using Border Gateway Protocol (BGP) signaling, wherein the apparatus comprises:

a processor coupled to a transmitter and receiver, wherein the processor is configured to:

support a first set of BGP capabilities, wherein the first set of BGP capabilities comprises at least one BGP capability;

transmit a first Open message comprising the first set of BGP capabilities;

receive a second Open message comprising a second set of BGP capabilities, wherein the second set of BGP capabilities comprises at least one BGP capability;

receive a first BGP Update message that requests for the network to be joined to the virtual network, wherein the first BGP Update message comprises a plurality of Address Family Identifier (AFI) routes;

determine to either accept or reject the first BGP Update message, wherein the first BGP Update message is rejected when AFI routes are rejected; and transmit a second BGP Update message, wherein the second BGP Update message indicates either acceptance or rejection of the first BGP Update message, wherein the network does not join the virtual network when the first BGP Update message is rejected, wherein the network joins the virtual network when the first BGP Update message is accepted, wherein a quality of service (QoS) requirement is associated with the network when joining the virtual network, wherein the first BGP Update message comprises an Extended Community field, and wherein the processor is further configured to perform a withdraw when the Extended Community field has the wrong length.

* * * * *

UNITED STATES PATENT AND TRADEMARK OFFICE
CERTIFICATE OF CORRECTION

| | | |
|---|---|---|
| PATENT NO. | : 8,861,345 B2 | Page 1 of 1 |
| APPLICATION NO. | : 13/668255 | |
| DATED | : October 14, 2014 | |
| INVENTOR(S) | : Susan Hares et al. | |

It is certified that error appears in the above-identified patent and that said Letters Patent is hereby corrected as shown below:

In the Claims

Column 29, Lines 36, Claim 19 should read:

The apparatus of claim 16, wherein the first BGP Route Refresh request comprises a first sequence number, wherein the BGP route update message comprises a second sequence number, and wherein the first sequence number and the second sequence number are the same.

Signed and Sealed this
Sixth Day of January, 2015

Michelle K. Lee
*Deputy Director of the United States Patent and Trademark Office*